United States Patent

Inaba et al.

[11] Patent Number: 6,074,724
[45] Date of Patent: Jun. 13, 2000

[54] MAGNETIC RECORDING MEDIUM

[75] Inventors: Hiroo Inaba; Kiyomi Ejiri; Masaki Suzuki; Koji Naoe; Yuichiro Murayama; Hiroaki Takano, all of Kanagawa, Japan

[73] Assignee: Fuji Photo Film Co., Ltd., Japan

[21] Appl. No.: 08/918,864

[22] Filed: Aug. 26, 1997

[30] Foreign Application Priority Data

Aug. 26, 1996 [JP] Japan ................................. 8-224168
Aug. 26, 1996 [JP] Japan ................................. 8-224170
Aug. 27, 1996 [JP] Japan ................................. 8-225337
Aug. 27, 1996 [JP] Japan ................................. 8-225339
Nov. 29, 1996 [JP] Japan ................................. 8-320137

[51] Int. Cl.$^7$ ................................................. G11B 5/702
[52] U.S. Cl. ..................... 428/141; 428/323; 428/329; 428/336; 428/425.9; 428/694 BR; 428/694 BS; 428/694 BM; 428/694 BL; 428/900
[58] Field of Search ..................... 428/141, 323, 428/329, 336, 425.9, 694 BR, 694 BS, 694 BM, 694 BL, 900

[56] References Cited

U.S. PATENT DOCUMENTS

| 5,496,622 | 3/1996 | Isobe et al. ............... 428/216 |
| 5,702,821 | 12/1997 | Murayama et al. ............... 428/425.9 |
| 5,718,964 | 2/1998 | Naoe et al. ............... 428/141 |
| 5,747,157 | 5/1998 | Hashimoto et al. ............... 428/332 |
| 5,876,833 | 3/1999 | Suzuki et al. ............... 428/141 |

Primary Examiner—Stevan A. Resan
Attorney, Agent, or Firm—Brinks Hofer Gilson & Lione

[57] ABSTRACT

A magnetic recording medium is disclosed, which comprises a support having thereon a magnetic layer comprising a binder and a ferromagnetic powder dispersed therein, wherein said binder comprises a polyurethane resin having at least one cyclic hydrocarbon group and at least one ether linkage, and said ferromagnetic powder is a ferromagnetic metallic powder which comprises Fe and has a mean major-axis length of from 0.05 to 0.19 μm and a crystallite size of from 100 to 230 Å; and further a magnetic recording medium is disclosed, comprising a support having thereon in succession an undercoat layer comprising a binder U and an inorganic powder dispersed therein and a magnetic layer comprising a binder M and a ferromagnetic powder dispersed therein, wherein at least either of the binder U or M comprises a polyurethane resin having at least one cyclic hydrocarbon group and at least one ether linkage and said ferromagnetic powder is a ferromagnetic metallic powder which comprises Fe and has a mean major-axis length of from 0.05 to 0.19 μm and a crystallite size of from 100 to 230 Å.

32 Claims, No Drawings

MAGNETIC RECORDING MEDIUM

FIELD OF THE INVENTION

The present invention relates to a magnetic recording medium which comprises a non-magnetic support having thereon a magnetic layer in which a ferromagnetic fine powder and a binder are dispersed, and which has especially good electromagnetic characteristics and durability.

BACKGROUND OF THE INVENTION

The magnetic recording medium is widely used as audio tapes for recording sound, video tapes, or tapes or floppy disks for recording computer data. The magnetic recording medium of these types has on a support a magnetic layer containing a ferromagnetic powder dispersed in a binder.

The magnetic recording medium is required to be on high levels with respect to various characteristics, including electromagnetic characteristics, running durability and running performance. More specifically, the audio tapes for reproducing recorded music are required to have a higher level of original sound-reproducing ability; while the video tapes are required to have excellent electromagnetic characteristics, including an excellent ability to reproduce originals.

For the recording medium which possesses excellent electromagnetic characteristics, as described above, it is necessary at the same time to have good running durability. In general, the magnetic recording medium can attain good running durability by the addition of abrasives and lubricants to their magnetic layers.

For achieving excellent running durability by the use of abrasives, however, a measure of increase in their addition amount is required to result in reduction of the packing degree of a ferromagnetic powder in the magnetic layer. In a case where the abrasives having large grain sizes are used for the aforementioned purpose, on the other hand, they are apt to protrude to excess from the magnetic layer surface. Therefore, an improvement of running durability due to use of abrasives often causes deterioration in the above-described electromagnetic characteristics.

In a case where lubricants are used for improvement of the aforementioned running durability, a large amount of the lubricants added is required. As a result, the magnetic layer is subject to deterioration in durability because the binder comes to have a tendency to be plasticized.

Further, it is a matter of course that the binder as a main component of the magnetic layer performs an important function in effecting improvements in both the foregoing durability and electromagnetic characteristics. Conventional binders, such as polyvinylchloride resins, cellulose resins, polyurethane resins and acrylic resins, have a problem in that the magnetic layers using them are inferior in abrasion resistance to result in soiling the parts of a magnetic tape-running system such as guide poles or guide rolles.

As one approach to the solution of such a problem, it was proposed to raise the hardness of a magnetic layer by the use of a hard binder.

For instance, the magnetic recording medium using the binder comprising a polyesterpolyurethane resin and a polycarbonatepolyurehtane resin is described in JP-A-06-96437 (the term "JP-A" as used herein means an "unexamined published Japanese patent application"). In Examples in this reference, the binders in which the content of urethane groups is from 2 to 4 mmol/g are described, but the long-chain diol (called "second diol" hereinafter) contents therein are indefinite and the OH contents also are unspecified. In addition, JP-A-06-19821 describes a binder containing an urethaneurea in which the total content of urethane and urea is from 1.8 to 3.0 mmol/g. According to Synthesis Example of the binder, the proportion of second diols in the polyurethane resin obtained is 61 weight % and the urethane linkage density is high. Accordingly, such a binder ensures excellent durability, but has a disadvantage in that it causes a viscosity increase of the coating solution which is accompanied by the lowering of dispersibility to deteriorate the electromagnetic characteristics.

Furthermore, it was proposed to employ as the binder a polyurethane resin using a short-chain diol (called "first diol" hereinafter) having at least one cyclic hydrocarbon group. For instance, JP-A-61-148626 uses as a diol the polyesterpolyol containing bisphenol A in a proportion of 20%. By the calculation from the data in Example of the reference cited, the proportions of bisphenol A and the polyol in the polyurethane resin are evaluated to be 13 weight % and 69 weight %, respectively. Since the cyclic hydrocarbon groups in a resin lower the resin's solubilities in solvents, the polyurethane resin of the foregoing type has a drawback of being inferior in dispersibility. As another example of a polyurethane resin using a first diol having cyclic hydrocarbon groups, the polyurethane using bisphenol A as a chain-lengthening agent and the polycarbonate-polyol as a starting material is described in JP-A-01-251416. The proportions of bisphenol A and the polyol in such a polyurethane resin are evaluated to be 16 weight % and 63 weight %, respectively, by the calculation from the data in Example of the above-cited reference, and so this polyurethane resin also has a problem that its dispersibility is lowered due to the solubility-lowering effect of the cyclic hydrocarbon groups present therein. As a further examples of a polyurethane resin of the foregoing type, the polyurethane resin using a bisphenol S-containing and lactone-modified polyol is described in JP-B-07-21851 (the term "JP-B" as used herein means an "examined Japanese patent publication"). Therein, the proportions of the polyol and bisphenol S are evaluated to be 52 weight % and 13 weight %, respectively, by the calculation from the data in Example of the above-cited reference. Accordingly, such a polyurethane resin also has the same problem as mentioned above because of the presence of the cyclic hydrocarbon groups therein.

Also, the polyurethane resins using polyetherpolyols having cyclic hydrocarbon groups, e.g., the diols (molecular weight: 250 to 3,000) such as ethylene oxide or propylene oxide adducts of bisphenol A or hydrogenated bisphenol A, are described in U.S. Pat. No. 5,153,071. All the polyurethane resins obtained in Examples of this reference contain polyols in a proportion of no lower than 70 weight % and have an ether content of at least 8 mmol/g, so that the coated film made are soft. As a result, those coated film suffer from disadvantages of soiling a magnetic head and having low durability.

Further, JP-A-61-190717 describes the polyurethane resins using polytetramethyleneglycol and polycaprolactonepolyol. According to the descriptions in Examples of this reference, the polyols are present in each resin in a proportion of at least 70 weight %, so that the coated film formed are soft similarly to the above. Thus, such resins also have problems of soiling a magnetic head and deteriorating the durability.

Furthermore, JP-B-06-64726 describes the polyurethane resin obtained by reacting a branched polyesterpolyol with a prepolymer having terminal isocyanate groups. The content of OH groups in such a resin is evaluated to be $8.2 \times 10^{-5}$ eq/g from the data in Synthesis Example. Such a high content of OH groups causes an increase in viscosity of the resin solution to lower the dispersibility. In addition, such a resin is attended by lowering of strength and deterioration in repeated running properties due to the presence of branched polyols therein.

Similarly to the above, the magnetic recording medium using a binder prepared from a compound having at least one OH group at both terminals and a polyisocyanate is described in U.S. Pat. No. 5,254,404. Although this reference describes only use of a polyesterpolyol, the binder obtained still has the resin strength-lowering problem and the problem of causing deterioration in repeated running properties.

In addition, JP-A-62-82510 describes the binder comprising a polyurethane resin wherein the number of terminal groups present on the main and branched chains is at least 3 on the average and primary hydroxyl groups are present on at least two terminals. In Examples thereof, use of polyesterpolyols is described. However, the resins prepared therein are insufficient in resin strength and repeated running durability.

In preparing conventionally known polyurethane resins and polyurethaneurea resins used as binders for a magnetic recording medium, as mentioned above, the second diols having hydrophilic segments, such as polyester, polyether and polycarbonate, are generally employed. According to Examples described in the prior arts, all the resins obtained contain the second diols in a proportion of at least 25 mole %.

However, the hydrophilic segments in the above-recited polyurethane resins and polyurethaneurea resins hinder the resins from having affinity for organic solvents, and the hydrophilic polar groups are subject to aggregation; as a result, the resins show a weak tendency to stretch their molecular chains in an organic solvent. Thus, the presence of hydrophilic segments in the resins acts adversely on the dispersion of a ferromagnetic fine powder.

In addition, those second diols having hydrophilic segments are attended by drawbacks that, when they are polyesters, the polyurethane resins obtained have inferior storage stability because of ester linkage's liability to hydrolysis; while, when they are polyethers such as polytetramethylene ether glycol, polypropylene glycol and polyethylene glycol, the polyurethane resins obtained are soft and have low Tg to form films having low strength.

Moreover, magnetic recording medium of another type is known, wherein the magnetic layer has a reduced thickness due to the formation on a nonmagnetic layer. In order to effect a further increase in recording density, it becomes necessary to further reduce the thickness of a magnetic layer and use a more finely pulverized ferromagnetic metal powder. The fine pulverization of a ferromagnetic metal powder causes the lowering of dispersibility to result in deterioration in surface quality and electromagnetic characteristics of the magnetic layer, and further to make it difficult for the magnetic layer to secure the durability.

In the present situation that it is required for a polyurethane resin to have excellent ability to disperse a ferromagnetic metal powder and a nonmagnetic powder, and to impart both hardness (high Tg and high Young's modulus) and elasticity (elongation) to the magnetic layer, and to ensure excellent durability in the magnetic layer, the polyurethane resins as recited above fail in satisfactorily meeting the aforesaid requirements.

Although the tapes utilizing vacuum deposited thin films of ferromagnetic metals (ME) are available at present as 8-mm video tapes and video tapes appropriate to DVC (which stands for a digital video camera) for consumer use, ferromagnetic metal powder-coated tapes (MP) have an advantage of being superior to ME in durability and economic efficiency, but on the other hand they are inferior to ME in electromagnetic characteristics.

And there is a desire to make further improvements in the running durability and the electromagnetic characteristics of magnetic fine powder-coated magnetic recording medium.

SUMMARY OF THE INVENTION

Therefore, an object of the present invention is to provide a magnetic recording medium which has a high level of durability and excellent electromagnetic characteristics, including excellent reproducing output.

According to one aspect of the present invention, there is prepared a magnetic recording medium which comprises a support having thereon a magnetic layer comprising a binder and a ferromagnetic powder dispersed therein, wherein the binder comprises a polyurethane resin having at least one cyclic hydrocarbon group and at least one ether linkage, and the ferromagnetic powder is a ferromagnetic metal powder which comprises Fe and has a mean major-axis length of from 0.05 to 0.19 $\mu$m and a crystallite size of from 100 to 230 Å (which is called "the first embodiment", hereinafter).

According to another aspect of the present invention, there is provided a magnetic recording medium comprising a support having thereon in succession an undercoat layer comprising a binder U and an inorganic powder dispersed therein and a magnetic layer comprising a binder M and a ferromagnetic powder dispersed therein, wherein at least either of the binder U or the binder M comprises a polyurethane resin having at least one cyclic hydrocarbon group and at least one ether linkage and the ferromagnetic powder is a ferromagnetic metal powder which comprises Fe and has a mean major-axis length of from 0.05 to 0.19 $\mu$m and a crystallite size of from 100 to 230 Å (which is called "the second embodiment", hereinafter).

In a magnetic recording medium according to the first embodiment, by using a particular polyurethane resin, which has the cyclic hydrocarbon group and ether linkage, as at least a part of a binder, and further using in combination therewith a specified ferromagnetic powder which has high potential, excellent electromagnetic characteristics can be obtained. Use of the polyurethane resin as defined above enables the ferromagnetic powder to be dispersed more satisfactorily than ever; as a result, the magnetic recording medium comes to have a very high squareness ratio and low SFD (Switching Field Distribution): and, at the same time, the magnetic recording medium having an excellent running durability can be obtained.

With respect to a magnetic recording medium according to the second embodiment, the undercoat layer provided therein enables a greater reduction in the thickness of a magnetic layer formed thereon; as a result, the magnetic recording medium can have further improved electromagnetic characteristics. In accordance with the second embodiment, a magnetic recording medium undergoing improvements in electromagnetic characteristics and running durability can be obtained even when the aforesaid particular polyurethane resin is used as at least a part of the binder in the undercoat layer alone. For a reason of the improvements, it is assumed that the inorganic powder can be dispersed more satisfactorily than ever in the undercoat layer to enhance the smoothness of the magnetic layer surface. Of course, it is most desirable for the second embodiment to use the aforesaid particular polyurethane resin as at least a part of the binder in both the magnetic layer and the undercoat layer.

DETAILED DESCRIPTION OF THE INVENTION

The polyurethane resin having at least one cyclic hydrocarbon group and at least one ether linkage, which is a characteristic component of the magnetic recording medium of the present invention, is preferably a polyurethane resin produced by reacting organic diisocyanates with a first diol having at least one cyclic hydrocarbon group and a molecular weight of from 50 to less than 500 and a second diol having at least one ether linkage and a molecular weight of 500 to 5,000.

It is desirable for the polyurethane resin used in the present invention to contain in the molecule at least one polar group selected from the group consisting of $-SO_3M$, $-OSO_3M$, $-COOM$, $-PO_3MM'$, $-OPO_3MM'$, $-NRR'$ and $-N+RR'R''COO^-$ (wherein M and M' are each a hydrogen atom, or an alkali metal, alkaline earth metal or ammonium ion, and R, R' and R'' are each an alkyl group having 1 to 12 carbon atoms). In particular, $-SO_3M$ and $-OSO_3M$ are preferred as the polar groups contained in the present polyurethane resin. The suitable content of such the polar groups in the polyurethane resin is preferably from $1 \times 10^{-5}$ to $2 \times 10^{-4}$ eq/g, particularly preferably from $5 \times 10^{-5}$ to $1 \times 10^{-4}$ eq/g. When the polar group content is less than $1 \times 10^{-5}$ eq/g, the resin is insufficient in the ability for adsorbing onto a ferromagnetic powder; as a result, its effect on the dispersibility enhancement is lessened. When the polar group content is more than $2 \times 10^{-4}$ eq/g, on the other hand, its solubilities in solvents become low.

The expression "first diol having at least one cyclic hydrocarbon group" used in the present invention means and defines a diol containing therein one or more of a saturated or unsaturated cyclic structure and having a molecular weight of less than 500. Suitable examples thereof include alicyclic and aromatic diols such as bisphenol A, the hydrogenated bisphenol A of the following formula (I), bisphenol S, bisphenol P, ethylene oxide and/or propylene oxide adducts of these bisphenols, cyclohexane dimethanol and cycloxhanediol:

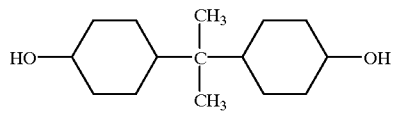

(I)

Of these diols, the hydrogenated bisphenol A represented by formula (I) and the ethylene oxide and/or propylene oxide adducts thereof are preferred in particular.

The first diol used in the present invention, which has at least one cyclic hydrocarbon group, is selected from those having a molecular weight of from 50 to less than 500, preferably from 100 to 400, and most preferably from 100 to 300. When the first diol used has a molecular weight of less than 50, the magnetic layer obtained is brittle and has inferior durability; while, when the diol having at least one cyclic hydrocarbon group has a molecular weight of 500 or more (namely, the first diol defined by the present invention is not used), the drop in glass transition temperature (Tg) is caused in the magnetic layer obtained to render the magnetic layer soft, and thereby the durability is lowered.

In addition to the first diol having at least one cyclic hydrocarbon group, another diol having a molecular weight of less than 500 can be used. Specific examples thereof include straight-chain and branched diols, such as ethylene glycol, 1,3-propylenediol, 1,2-propylene glycol, 1,4-butanediol, 1,5-pentanediol, 1,6-hexanediol, 2,2-dimethylpropanediol, 1,8-octanediol, 1,9-nonanediol, diethylene glycol, and ethylene oxide or propylene oxide adducts of N-diethanolamine.

When those diols are used together, not only high strength, high Tg and high durability can be imparted to the coated film formed because of presence of cyclic hydrocarbon groups, but also high dispersibility can be obtained because the polyurethane resin produced can have excellent solubilities in solvents due to the introduction of methyl branches thereinto.

The suitable proportion of first diol (units) in the polyurethane resin is from 17 to 40 weight %, preferably from 20 to 30 weight %. When the proportion is lower than 17 weight %, the coated film formed is too soft to have sufficient strength; as a result, the still durability is lowered. When the proportion is higher than 40 weight %, on the other hand, the polyurethane resin has reduced solubilities in solvents, and thereby the drop in dispersibility of a ferromagnetic-powder tends to be caused; as a result, the electromagnetic characteristics are subject to deterioration and the strength of the magnetic layer is lowered.

The expression "second diol having at least one ether linkage" used in the present invention means and defines a diol containing therein a plurality of ether linkage and having a molecular weight of at least 500. Suitable examples thereof include the products obtained by addition reaction of bisphenol A, hydrogenated bisphenol A, bisphenol S or bisphenol P with ethylene oxide, propylene oxide or the mixture thereof, polypropylene glycol, polyethylene glycol and polytetramethylene glycol. In particular, the compounds represented by the following formula (II) are preferred:

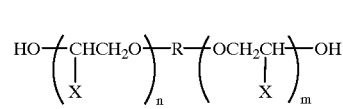

(II)

In the above formula, R is at least one group selected from

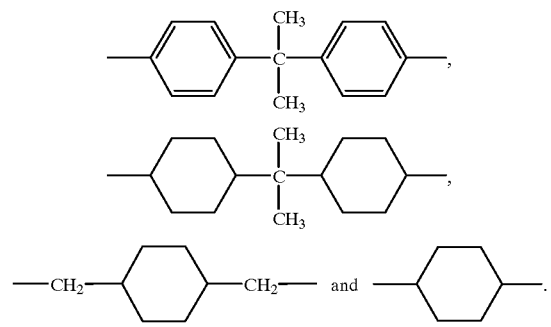

The subscripts n and m are each an integer of from 3 to 24, preferably from 3 to 20, and particularly preferably from 4 to 15. When n and m are each less than 3, the urethane linkage density in the resin becomes high, so that the resin tends to have low solubilities in solvents, form a brittle coated film and lower the dispersibility and the durability.

As R in the foregoing compounds preferred as the second diol, the following group (i) or (ii) is desirable:

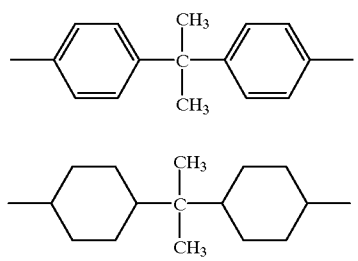

In particular, the group (i) is preferable.

Further, X in the foregoing compounds preferred as the second diol is desirably a hydrogen atom or a methyl group, more preferably a methyl group. The groups represented by X in brackets with the subscript n or m are not necessarily the same, but some of them may be hydrogen atoms and the others may be methyl groups.

The polyurethane resins according to preferred embodiments as mentioned above can ensure high film strength and excellent durability because of containing cyclic hydrocarbon groups, and further can have high solubilities in solvents and excellent dispersibility since they have methyl branches which come from polypropylene oxide units.

The weight average molecular weight (Mw) of the second diol is from 500 to 5,000. When the Mw of the second diol is less than 5,000 a reduction in film strength is caused, and the film formed becomes soft to deteriorate in durability. Therefore, it is preferable that the Mw of the second diol be chosen from the range of 700 to 3,000.

The suitable proportion of the ether linkage-containing second diol (units) in the present polyurethane resin is from 10 to 50 weight %, preferably from 30 to 40 weight %. When the proportion is smaller than 10 weight %, the resin has reduced solubilities in solvents to deteriorate in dispersibility; while, when it is larger than 50 weight %, the strength of the coated film formed is reduced to decrease the durability. It is desirable for the ether groups of the second diol (units) to be contained in the polyurethane resin in an amount of 1.0 to 5.0 mmol/g, preferably 2.0 to 4.0 mmol/g. When the amount of the ether groups contained is less than 1 mmol/g, the ability of the resin adsorbing onto a ferromagnetic powder is lowered and thereby the drop in dispersibility is caused; while, when it is more than 5.0 mmol/g, the solubilities of the resin in solvents are lowered and thereby the dispersibility is decreased.

Examples of the organic diisocyanate compounds as the other starting material for synthesis of the polyurethane resin of the present invention, include aromatic diisocyanates such as 2,4-tolylenediisocyanate, 2,6-tolylenediisocyanate, xylene-1,4-diisocyanate, xylene-1,3-diisocyanate, 4,4'-diphenylmethanediisocyanate, 4,4'-diphenyletherdiisocyanate, 2-nitrodiphenyl-4,4'-diisocyanate, 2,2'-diphenylpropane-4,4'-diisocyanate, 4,4'-diphenylpropanediisocyanate, m-phenylenediisocyanate, p-phenylenediisocyanate, naphthylene-1,4-diisocyanate, naphthylene-1,5-diisocyanate and 3,3'-dimethoxydiphenyl-4,4'-diisocyanate, aliphatic diisocyanates such as lysinediisocyanate, and alicyclic diisocyanates such as isophoronediisocyanate, hydrogenated tolylenediisocyanate and hydrogenated diphenylmethanediisocyanate are specific examples thereof.

The number average molecular weight (Mn) of the polyurethane resin of the present invention is suitably from 5,000 to 100,000, preferably from 10,000 to 50,000, and more preferably from 20,000 to 40,000; while the weight average molecular weight (Mw) thereof is suitably from 30,000 to 100,000, preferably from 40,000 to 60,000. When they are less than the ranges, the magnetic layer formed has reduced strength to deteriorate in durability; while, when they are more than the ranges, the resin has low solubilities in solvents and thereby the durability of the magnetic layer formed is reduced.

It is desirable for the polyurethane resin of the present invention to have a glass transition temperature Tg in the range of 50 to 200° C., preferably 80 to 150° C., more preferably 100 to 130° C. When the Tg is lower than 50° C., the magnetic layer obtained suffers a drop in strength at high temperatures to cause deterioration in durability and storage stability. When the Tg is higher than 200° C., on the other hand, the calender moldability of the resin is lowered and thereby the magnetic layer formed suffers deterioration in electromagnetic characteristics.

When the polyurethane resin of the present invention is used in a magnetic layer in both first and second embodiments, the polyurethane resin may be used together with a polyvinylchloride resin which is preferably a vinyl chloride polymer containing vinyl chloride as a recurring unit. The polymerization degree of a polyvinylchloride resin usable together with the polyurethane resin is preferably from 200 to 300, preferably from 250 to 450. Such the polyvinylchloride resin may be a copolymer of vinyl chloride and another vinyl monomer, e.g., vinyl acetate, vinyl alcohol, vinylidene chloride or acrylonitrile. In addition to the polyvinylchloride resin as recited above, other resins, including a cellulose derivative (e.g., a nitrocellulose resin), an acrylic resin, a polyvinylacetal resin, a polyvinylbutyral resin, an epoxy resin and a phenoxy resin, may also be used together with the polyurethane resin, wherein they can be used alone or in combination of two or more thereof.

In a case where the polyurethane resin is used together with other synthetic resins, the amount of the polyurethane resin based on the binder (the total of a resin component and a hardener) contained in the magnetic layer is preferably from 10 to 100 weight %, and more preferably from 20 to 100 weight %. When the proportion is less than 10 weight %, the binder has reduced solubilities in solvents to cause deterioration in dispersibility.

In view of hardening of the polyurethane resin of the present invention with an isocyanate hardener as described hereinafter, it is desirable for the polyurethane resin to have 3 to 20 hydroxyl groups, preferably 4 or 5 hydroxyl groups, per one molecule. When the number of hydroxyl groups per one molecule is smaller than 3, the reactivity of the resin with an isocyanate hardener described below is lowered to cause a reduction in film strength, and thereby the durability is deteriorated. When the number of hydroxyl groups per one molecule is greater than 20, on the other hand, the solubilities of the resin in solvents are lowered, and thereby the dispersibility is reduced.

For controlling the content of hydroxyl groups in the polyurethane resin, a compound having at least three hydroxyl groups as its functional groups can be used. Specific examples of such the compound include trimethylolethane, trimethylolpropane, trimellitic acid anhydride, glycerine, pentaerythritol and hexanetriol, and further branched polyesters and polyether esters having at least three OH functional groups per one molecule which are prepared from the dibasic acids used as starting materials of the polyesterpolyols described in JP-B-06-64726 cited hereinbefore as a prior art and the foregoing compounds as a glycol component. Of these compounds, the trifunctional compounds are preferred, because tetrafunctional or higher compounds tends to cause gelation in the reaction process.

Further, it is desirable to use a hardener for the purpose of cross-linking the polyurethane resin molecules of the present invention each other or simultaneously used other resin molecules each other. Use of such the hardener can produce an extreme improvement in running durability.

The isocyanate hardener mentioned above can be selected from polyisocyanate compounds used as a hardener component for conventional polyurethane resins and the like. Specific examples of such the polyisocyanate compound include the reaction product of 3 moles of tolylenediisocyanate and 1 mole of trimethylolpropane (e.g., Desmodur L-75, made by Bayer Co., Ltd.), the reaction product of 3 moles of diisocyanate, such as xylylenediisocyanate or hexamethylenediisocyanate, and 1 mole of trimethylolpropane, the biuret adduct obtained from 3 moles of hexamethylenediisocyanate, the isocyanurate compound obtained from 5 moles of tolylenediisocyanate, the isocyanurate adduct obtained from 3 moles of tolylenediisocyanate and 2 moles of hexamethylenediisocyanate, and isophoronediisocyanate-diphenylmethanediisocyanate polymers.

In coated layers, including a magnetic layer and an undercoat layer (which is also called a lower layer, hereinafter), it is desirable for the polyisocyanate compound to be contained in a proportion of 5 to 50 weight %, preferably 10 to 40 weight %, based on the binder (the total of a resin component and a hardener).

When the hardening treatment is carried out by irradiation with electron beams, on the other hand, compounds having a reactive double bond, such as urethaneacrylate, can be employed as a hardener.

In general, the suitable amount of the binder used is from 15 to 40 parts by weight, preferably from 20 to 30 parts by weight, per 100 parts by weight of a ferromagnetic powder.

In the case where the undercoat layer is provided as described hereinafter, the amount of a binder used in the undercoat layer is generally from 5 to 35 parts by weight per 100 parts by weight of an inorganic powder contained therein.

The ferromagnetic powder used in the magnetic recording medium has no particular limitation so far as it contains Fe as a main component and has a mean major axis length of from 0.05 to 0.19 $\mu$m and a crystallite size of from 100 to 230 Å. However, it is desirable for the ferromagnetic powder to have a coercive force (Hc) of from 1,650 to 3,000 oersted (abbreviated as "Oe" hereinafter) and a saturation magnetization ($\sigma_s$) of from 125 to 180 emu/g.

It is desirable for the ferromagnetic powder as mentioned above to have a specific surface area ($S_{BET}$) of from 35 to 80 m$^2$/g, preferably from 40 to 60 m$^2$/g, determined by BET method. As the ferromagnetic metal powder, the powders of Fe, Fe—Co, Fe—Ni and Co—Ni—Fe are exemplified. These metals and metal alloys may be alloys containing as other elements Al, Si, S, Sc, Ti, V, Cr, Mn, Cu, Zn, Y, Mo, Rh, Pd, Au, Sn, Sb, B, Ba, Ta, W, Re, Ag, Pb, P, La, Ce, Pr, Nd, Te and Bi in a proportion of no greater than 20 weight %.

The ferromagnetic metal powders particularly preferred in the present invention are ferromagnetic alloy powders wherein Fe is contained as a main component and further Co in an amount of from 10 to 40 atomic % based on Fe, Al in an amount of from 2 to 20 atomic % based on Fe and Y in an amount of from 1 to 15 atomic % based on Fe. And the major-axis length of such the powder is preferably from 0.05 to 0.15 $\mu$m, more preferably from 0.06 to 0.1 $\mu$m. In addition, the crystallite size thereof is preferably from 100 to 200 Å, more preferably from 100 to 170 Å. The coercive force (Hc) of such the ferromagnetic alloy powder is preferably from 1,800 to 2,800 Oe, more preferably from 2,000 to 2,500 Oe.

The ferromagnetic metal powders as mentioned above may contain a slight amounts of water, hydroxides or oxides. The preparation methods of those ferromagnetic powders are already well-known, and so the ferromagnetic powder used in the present invention can also be produced in accordance with well-known methods.

The ferromagnetic alloy powders, although they have no particular restriction on their shape, are preferably needle-shaped or spindle-shaped particles.

In particular, spindle-shaped ferromagnetic alloy powders are advantageous to the present invention. Such powders can be produced by reduction of spindle-shaped goethite. More specifically, an aqueous solution of ferrous salt, e.g., ferrous sulfate, and an aqueous solution of alkali carbonate, e.g., ammonium carbonate, are reacted with each other under pH of 5 to 8 to obtain an iron-containing sediment in the form of suspension, and this suspension is ripened for 2 to 7 hours at 40 to 60° C. in a non-oxidative atmosphere. Just before the start or in the course of the foregoing ripening step, an aqueous solution of cobalt salt, such as cobalt sulfate or cobalt nitrate, is added to the suspension. Additionally, a part of the aqueous solution of cobalt salt can be added in advance to the aqueous solution of ferrous salt. After the ripening step, air is bubbled into the suspension to effect the oxidation reaction. Thus, spindle-shaped Co-containing goethite particles are prepared. These goethite particles are filtered off, washed with water, and then filter-pressed. Thereafter, the resulting particles are suspended in water, and thereto a cobalt salt, such as cobalt acetate, an aqueous solution of aluminum salt, such as aluminum sulfate and an aqueous solution of yttrium salt, such as yttrium nitrate, are added, if needed. Further, at least one aqueous solution selected from an aqueous solution of sodium silicate, such as water glass, an aqueous solution of neodymium salt, such as neodymium nitrate and an aqueous solution of boric acid is added to the suspension, if desired. Additionally, at least part of these aqueous solutions may be added in the course of the oxidation reaction step included in the preparation process of the aforesaid goethite.

Then, if necessary, the suspension is subjected to pH adjustment, admixed with a well-known flocculent of organic polymer type, and filtered off by means of a filter press and an Oliver filter. The thus obtained cake is granulated, molded, and then dried. Further, it is subjected to heat treatment in the air at a temperature of, from 250 to 500° C. to be made into hematite particles. Thereafter, these particles are subjected to heat reduction with hydrogen gas at a temperature of from 300 to 550° C., and further to oxidation treatment for covering the particle surface with an oxidized film. For this oxidation treatment, a method of soaking the heat-reduced molding of metal alloy particles in an organic solvent and bubbling thereinto an oxygen-containing gas, e.g., air, or a method of exposing the heat-reduced molding of metal alloy particles to an atmosphere of oxygen gas-inert gas mixture while controlling the partial pressure of oxygen gas can be adopted, but the latter method is preferable.

The aforementioned resin component, hardener and ferromagnetic powder are kneaded and dispersed together with a solvent used for preparation of conventional magnetic coating compositions, such as methyl ethyl ketone, dioxane, cyclohexanone or ethyl acetate, thereby obtaining a magnetic coating composition.

In addition to the foregoing ingredients, the magnetic coating composition may contain generally used additives, including an abrasive such as $\alpha$-$Al_2O_3$ or $Cr_2O_3$, an antistatic agent such as carbon black and a lubricant such as a fatty acid, a fatty acid ester or a silicone oil, and a dispersant; or may contain a filler.

Next, lower coated layers, namely a lower non-magnetic layer and a lower magnetic layer, which can constitute the magnetic recording medium when it has a multi-layer structure, are described in detail. Although it doesn't matter whether the inorganic powders used in the lower layers are magnetic or non-magnetic powders, non-magnetic powders are preferred as the inorganic powders. The suitable non-magnetic powders can be selected from powders of inorganic compounds, such as metal oxides, metal carbonates, metal sulfates, metal nitrides, metal carbide and metal sulfides. Specific examples of such the inorganic compound include $\alpha$-alumina having $\alpha$-conversion of 90 to 100%, $\beta$-alumina, $\gamma$-alumina, goethite, silicon carbide, chromium oxide, cerium oxide, $\alpha$-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide. These compounds can be used alone or as a mixture of two or more thereof. Of the above-recited compounds, titanium dioxide, zinc oxide, iron oxide and barium sulfate are preferred. In particular, titanium oxide and $\alpha$-iron oxide are preferred from the viewpoints of availability, cost and easy control of particle size distribution.

For the $\alpha$-iron oxide, it is desirable to be needle-shaped or spindle-shaped particles which have an average major axis length of from 0.05 to 0.3 $\mu$m, a major axis length/minor axis length ratio of from 3 to 10 and pH of 8 to 14.

For the titanium oxide, on the other hand, it is desirable to be spherical particles which have a specific surface area ($S_{BET}$) of from 50 to 80 $m^2$/g and pH of 8 to 11. The preferable particle size thereof is from 0.01 to 0.1 $\mu$m.

The specific surface area of the non-magnetic powders is from 1 to 100 $m^2$/g, preferably from 5 to 50 $m^2$/g, more preferably from 7 to 40 $m^2$/g, and the crystallite size thereof is preferably from 0.01 to 2 $\mu$m. Further, they have an oil absorption using DBP of 5 to 100 ml/100 g, preferably 10 to 80 ml/100 g, and more preferably 20 to 60 ml/100 g.

It is desirable for the non-magnetic powder used that at least a part of the surface of the non-magnetic powder be coated with $Al_2O_3$, $SiO_2$, $TiO_2$, $ZrO_2$, $SnO_2$, $Sb_2O_3$ or ZnO. Of these oxides, $Al_2O_3$, $SiO_2$, $TiO_2$ and $ZrO_2$, especially $Al_2O_3$, $SiO_2$ and $ZrO_2$, are preferred from the viewpoint of the dispersibility. Those oxides can be used alone or in combination of two or more thereof. Also, the non-magnetic powder may have, if desired, a surface layer formed by a coprecipitation treatment, or a surface coating formed by coating with alumina first and then with silica, or coating them in the reverse order. In addition, the surface coating layer may be a porous layer, if desired, but it generally prefers a uniform dense layer.

The incorporation of carbon black in the lower layers enables not only the drop in Rs, which is well-known as an effect thereof, but also the achievement of the desired micro Vickers hardness. As examples of carbon black which can be used for those purposes, mention may be made of furnace black for rubber, thermal black for rubber, coloring carbon black and acetylene black.

The specific surface area ($S_{BET}$) of the carbon black which can be used is from 100 to 500 $m^2$/g, preferably from 150 to 400 $m^2$/g, and the DBP oil absorption thereof is from 20 to 400 ml/100 g, preferably from 30 to 200 ml/100 g. The average particle size of carbon black which can be used is from 5 to 80 nm, preferably from 10 to 50 nm, and more preferably from 10 to 40 nm. It is desirable for the carbon black used that the pH be from 2 to 10, the water content be from 0.1 to 10% and the tapped density be from 0.1 to 1 g/ml. Specific examples of the carbon black which can be used in the present invention include BLACKPEARLS 2000, 1300, 1000, 900, 800, 880 and 700, and VULCAN XC-72 (produced by Cabot Co., Ltd.); #3050B, 3150B, 3250B, #3750B, #3950B, #950, #650, #970B, #850B and MA-600 (produced by Mitsubish Chemical Co., Ltd.); CONDUCTEX SC and RAVEN 8800, 8000, 7000, 5750 5250, 3500, 2100, 2000, 1800, 1500, 1255 and 1250 (produced by Columbian Carbon Co., Ltd.); and Ketjen Black EC (produced by Akzo Co., Ltd.).

The lower layer provided in the present invention may contain a magnetic powder. As the magnetic powder, a $\gamma$-$Fe_2O_3$ powder, a Co-modified $\gamma$-$Fe_2O_3$ powder, an alloy powder containing $\alpha$-Fe as a main component and a $CrO_2$ powder are exemplified. In particular, a Co-modified $\gamma$-$Fe_2O_3$ powder is preferred. It is desirable for the ferromagnetic powder used in the lower layer to have the same composition and properties as the ferromagnetic powder used in the upper magnetic layer. However, it is known that differences in properties can be made between the lower layer and the upper layer, if desired. For instance, when improvements in long wavelength recording characteristics are intended, it is desirable that the Hc of the lower magnetic layer be lower than the upper magnetic layer, and it is effective to design the lower magnetic layer so as to be higher in Br (residual magnetic flux density) than the upper magnetic layer. In addition, it is possible to draw advantages from the adoption of well-known double layer structures.

As the binders, lubricants, dispersing agents, additives, solvents, dispersing methods and so on which can be used for lower coated layers, such as a lower magnetic layer and a lower non-magnetic layer, those so far been used for magnetic layers can be suitable examples thereof. In particular, the well-known arts of making magnetic layers can be applied in choosing the amounts and the types of binder, additives and dispersing agent to be used in the lower coated layers.

The magnetic coating composition prepared in the manner as mentioned above is coated on a non-magnetic support to form a magnetic layer.

Examples of a non-magnetic support used preferably in the present invention include well-known plastic films, tapes or sheets which are subjected to a biaxial stretching treatment, such as those of polyethylene naphthalate (PEN), polyethylene terephthalate (PET), polyamide, polyimide, polyamideimide, aromatic polyamide and polybenzoxidazoles. Of these polymers, polyethylene terephthalate and aromatic polyamides are preferred. These non-magnetic support may receive in advance a corona discharge treatment, a plasma treatment, an adhesiveness-increasing treatment, a heat treatment and so on. For a non-magnetic support which can be used in the present invention, it is desirable to have a good surface smoothness such that the center line average surface roughness is from 0.1 to 20 nm, preferably 1 to 10 nm, at the cut-off value of 0.25 mm. It is further desirable for the non-magnetic support used in the present invention to have a surface which is free from coarse projections having a size of 1 i or greater, and small in center line average surface roughness as well.

Also, at the surface side of the non-magnetic support in which the magnetic layer is provided, the FE of H1 is 200/100 cm² or less, preferably from 150/100 cm² or less and the FE of H2 is 7/100 cm² or less and preferably 2/100 cm² or less.

Herein, the term "H1" means a number density of fish eyes (FE) having a height of from 0.273 µm to less than 0.546, in which the streak generated when the light having a wavelength of 0.273 µm is irradiated on the support surface is a single-ring interference. The H1 is represented by the number of the interference streaks per 100 m².

The thickness of the non-magnetic support is from 4 to 15 µm, preferably from 4 to 9 µm.

The influence on the back layer due to projections is easily generated on handling tension when the non-magnetic support is thin. Accordingly, the influence can be reduced by providing the polyurethane resin of the present invention for the uppermost layer.

When the thickness of the non-magnetic support is 7 µm or less, PEN or aromatic polyamide such as aramid is preferably used for the non-magnetic support.

The thickness of each layer in various layer structures of the present invention is as follows:

1) When the magnetic layer is a single layer, the thickness thereof is generally from 0.2 to 5 µm, preferably from 0.5 to 3 µm, more preferably from 0.5 to 1.5 µm.

2-a) When the upper layer and the lower layer in a double layer structure are both magnetic layers, the thickness of the upper layer is generally 0.2 to 2 µm, preferably from 0.2 to 1.5 µm, and that of the lower layer is generally from 0.8 to 3 µm.

2-b) When the double layer structure has a magnetic layer as the upper layer and a non-magnetic layer as the lower layer, the thickness of the upper layer is generally 0.05 to 1 µm, preferably from 0.05 to 0.5 µm, more preferably from 0.1 to 0.3 µm, and the thickness of the lower layer is generally from 0.5 to 3 µm, preferably from 0.8 to 3 µm.

The magnetic recording medium of the present invention can be prepared, e.g., by coating a coating composition for a magnetic layer on a non-magnetic support while running so that the magnetic layer has a dry thickness of from 0.05 to 5 µm, preferably from 0.07 to 1 µm, more preferably from 0.1 to 0.5 µm, most preferably from 0.1 to 0.3 µm. Therein, plural magnetic coating compositions may be coated successively or simultaneously in a multi-layer form.

Examples of the coating machine usable for coating the foregoing magnetic coating compositions include an air doctor coating machine, a blade coating machine, a rod coating machine, an extrusion coating machine, an air knife coating machine, a squeeze coating machine, an immersion coating machine, a reverse roll coating machine, a transfer roll coating machine, a gravure coating machine, a kiss coating machine, a cast coating machine, a spray coating machine and a spin coating machine.

For details thereof a book entitled "The Latest Coating Technique", published by Sogo Gijutsu Center Co., Ltd. (May 31, 1983), can be referred to.

When the present invention is applied to a magnetic recording medium having two or more constituent layers, the following coating apparatus and coating methods can be employed:

(1) First the lower layer is formed by using a coating apparatus generally used for coating a magnetic coating composition, such as gravure, roll, blade and extrusion coating machines, and then by using the support-pressured extrusion coating apparatus as described, e.g., in U.S. Pat. Nos. 4,480,583; 4,681,062 and 5,302,206, the upper layer is formed on the lower layer while the lower layer is in a wet condition.

(2) The lower and upper layers are formed almost simultaneously by means of a coating head having two slits through which coating compositions are passed respectively, as described in U.S. Pat. Nos. 4,854,262; 5,072,688 and 5,302,206.

(3) The lower layer and upper layers are formed almost simultaneously by means of the extrusion coating apparatus equipped with a backup roll, as described in JP-A-02-174965.

The non-magnetic support of the present invention may be provided with a back coat layer (backing layer) on the surface side at which the magnetic composition is not coated. More specifically, the back coat layer is a layer provided by applying a back coat layer-forming composition, which contains a granular component such as an abrasive and an antistatic agent, and a binder dispersed in an organic solvent, to the magnetic composition-uncoated side of a non-magnetic support. The foregoing granular component can comprise various kinds of inorganic pigments and carbon black, and as the foregoing binder, resins such as nitrocellulose, phenoxy resins, polyvinylchloride resins and polyurethane resins, can be used alone or as a mixture of two or more thereof.

Additionally, the non-magnetic support may be provided with adhesive layers on the side to be coated with a magnetic composition and the side to be coated with a back coat layer-forming composition respectively.

The magnetic layer formed by coating a magnetic composition is dried after orienting the ferromagnetic powder in the layer by means of a magnetic filed.

The thus dried magnetic layer is subjected to a surface-smoothing processing. For the surface-smoothing processing, a super-calendering process or the like can be adopted. By conducting the surface-smoothing processing, the holes generated in the magnetic layer upon drying by removal of the solvent therefrom are eliminated; as a result, the packing rate of the ferromagnetic powder is increased. Accordingly, the magnetic recording medium having excellent electromagnetic characteristics can be obtained.

Examples of a roll which can be used for a calendering process include heat-resistant plastic rolls, such as rolls made from epoxy, polyimide, polyamide or polyamideimide resin. Also, metal rolls can be used for the calendering.

With respect to the conditions for a calendering process, it is desirable for the calender rolls to be operated under the conditions that the roll temperature be in the range of 60° C. to 100° C., preferably 70° C. to 100° C., particularly preferably 80° C. to 100° C., and the roll pressure be in the range of 100 to 500 kg/cm, preferably 200 to 450 kg/cm, particularly preferably 300 to 400 kg/cm.

In producing the magnetic recording medium of the present invention, a heating process can be generally conducted after the calendering process.

From the viewpoint of tape linearity (securing the off-track margin), the importance of reduction in thermal shrinkage rate is increasing for recently high-density magnetic recording tapes. In particular, as the track is narrowed, it becomes necessary to control the shrinkage rate in the MD direction (the machine direction) to 0.07% or below. As a means of reduction in thermal shrinkage rate, there can be adopted a method heat-treating a web-shaped tape while handling it under a low tension, or a method heat-treating a tape in a laminated condition, such as in bulk or in the form of cassette tape (thermo-processing). The former method hardly causes the projections on the back side to be copied into the tape surface, but it cannot attain a great reduction in thermal shrinkage rate. The thermal shrinkage rate achievable by the former method, although it depends more or less on the annealing temperature, the staying time, the tape thickness and the handling tension, has a limit of the order of 0.1–0.12% in the case of 48 hours' treatment at 70° C.

The thermo-processing as the latter method can effect a great improvement in thermal shrinkage rate, but it has a strong influence on the copy of projections on the back side into the tape surface, thereby roughening the magnetic layer surface; as a result, a drop in output and an increase in noise are caused.

Since use of the polyurethane resin of the present invention in at least the uppermost layer makes it possible to confer high elasticity on the magnetic layer, and thereby it becomes hard for plastic deformation to reside in the magnetic layer, the magnetic recording medium can ensure high output and low noise even when the medium is subjected to thermo-processing.

After 48 hours' treatment at 70° C., the magnetic recording medium of the present invention has a thermal shrinkage rate of 0.12% or below in the MD direction. The thermal shrinkage rate in this case is determined as follows: A piece of tape 10 cm long and 8 mm wide, on one side of which a load of 0.2 g is put, is stored for 48 hours at 70° C. in a hung condition, and a change caused in tape length between after and before storage is divided by the tape length before storage (10 cm).

For the magnetic recording medium of the present invention, it is desirable to have a extremely smooth surface such that the center-line average surface roughness is from 0.1 to 4 nm, preferably 1 to 3 nm, at the cut-off value of 0.25 mm. In order to obtain such-an extremely smooth surface, for instance, the magnetic layer is formed using a particular ferromagnetic power and a specifically selected binder, as described above, and subjected to a calendering process as mentioned above. The suitable conditions for the calendering are a roll temperature of 60° C. to 100° C., preferably 70° C. to 100° C., particularly preferably 80° C. to 100° C., and a between-roll pressure of 100 to 500 kg/cm, preferably 200 to 450 kg/cm, particularly preferably 300 to 400 kg/cm.

At the time of practical use, the thus obtained magnetic recording medium is cut into pieces of the desired size by means of a cutter, a slitter or the like.

In a particularly preferred embodiment of the present invention, the aforementioned polyurethane resin having a specified structure is used in combination with an aromatic organic acid compound in at least a magnetic layer. This combined use can produce a further improvement in dispersibilities of various powders, including a ferromagnetic powder and a non-magnetic powder, in the magnetic layer; as a result, the durability of the magnetic recording medium can be heightened more than ever.

Since aromatic organic acid compounds can be strongly adsorbed to a powder surface, it can be supposed that the adsorption of the polyurethane resin to a powder surface is increased in strength and quantity through the aromatic organic acid compound adsorbed to the powder surface; as a result, further improvements in dispersibilities of powders and durability of the magnetic recording medium are achieved.

As the aromatic organic acid compounds used in the present invention, those which are strongly adsorbed to various powders and have high affinity to polyurethane resins are preferable. Therefore, it is desirable to use an aromatic organic acid compound having the highest possible dissociation constant (strong acid), specifically an organic acid having a pKa of 3 or below or the salt thereof. In the case of an oxide type magnetic powder to which cobalt adheres, however, an organic acid having a pKa of 3 or above, such as benzoic acid, is used because the cobalt is often eluted with a strong acid. The expression "aromatic organic acid compound having a pKa of 3 or below" used herein is intended to include aromatic organic acids having a pKa of 3 and the equivalents thereof and those having stronger acidity than the foregoing. Consequently, the numerical value of pKa itself is not greater than 3.

The concept of an aromatic organic acid compound used in the present invention includes not only a free acid but also salts and derivatives thereof, such as esters. The expression "adsorption to powders" as used above involves both physical adsorption and chemical adsorption including the covalent-bond.

Specific examples of an organic acid having pKa 3 or below include α-naphthylphosphate, phenylphosphate, diphenylphosphate, p-ethylbenzenephosphonic acid, phenylphosphonic acid, phenylphosphinic acid, methanesulfonic acid, benzenesulfonic acid, p-toluenesulfonic acid, naphthalene-α-sulfonic acid, naphthalene-β-sulfonic acid and salts thereof.

As the method of using such an aromatic organic acid compound, any embodiment can be employed as far as it enables full achievement of the foregoing characteristic. Preferably, the organic acid compound is added at the time when the powder and the binder are kneaded for the preparation of a coating composition, or the powder is subjected in advance to the surface treatment with an aromatic organic acid compound and then kneaded with the binder.

The amount in which an aromatic organic acid compound can be used, although it depends on the adsorption capacity of the compound to a powder, is generally from one tenth to twice the quantity of its saturated adsorption to the powder, preferably from one-half to 1.5 times the quantity of the saturated adsorption. As a general guide, the amount of an aromatic organic acid compound is from 10 to 400 μmol per g of powder.

The aromatic organic acid compounds which are preferably used in the present invention include the phosphorus compounds recited above as the organic acids having a pKa of 3 or below.

Such the phosphorus compound can be used in an amount of from 0.05 to 0.5 mol, preferably from 0.1 to 0.45 mol, per 1 kg of the ferromagnetic powder, and the proper amount for the phosphorus compound used is determined depending mainly on its adsorption capacity to a ferromagnetic powder used.

The magnetic layer prepared by using the phosphorus compound as described above can be defined by a P/Fe ratio therein, and the P/Fe ratio is specifically in the range of from 0.2 to 2.0, preferably from 0.4 to 1.6, more preferably from 0.5 to 1.2, expressed in terms of the ratio between peak intensities corresponding to P and Fe in the fluorescent X-ray spectrum. When the P/Fe ratio is smaller than 0.2, the magnetic layer has inferior dispersibility of ferromagnetic powder and a large Ra; as a result, the reproducing output becomes low and the durability is deteriorated. When the P/Fe ratio is greater than 2.0, on the other hand, the magnetic layer has a great coefficient of kinetic friction ($\mu$-value) to suffer serious deterioration in durability.

In the present invention, the measurement of P/Fe ratios using a fluorescent X-ray method is carried out under the following conditions:

i) Sample

The magnetic layer of a sample tape is peeled off, pulverized and then pressed into a hard mass.

ii) Determination of Intensity Ratio of P to Fe

As an apparatus for the measurement of fluorescent X-ray spectra, Geiger Flex Model 3064 M, made by Rigaku Co., is used.

In the apparatus, a Rh X-ray tube is installed, and the electric potential and current are set at 50 kV and 50 mA, respectively.

The intensity of FeK$\alpha$ ray is measured by means of a scintillation counter equipped with a LiF{220} spectroscopic crystal detector, and the intensity of PK$\alpha$ ray is measured by means of a proportional counter equipped with a Ge{111} spectroscopic crystal detector. Each of the measurements is continued for 20 seconds, and the integrated count is taken. This procedure is repeated three times, and the average of these three counts is calculated. The ratio between the thus determined intensities of PK$\alpha$ ray and FeK$\alpha$ ray is defined as the P/Fe ratio.

In the magnetic recording medium relating to another preferred embodiment of the present invention, the surface of the magnetic layer as mentioned above has a characteristic that, when the number of projections on the surface are observed for each 10 nm increase in projection height under an atomic force microscope (AFM), the number ($M_{10}$) of projections having the heights in the range of from 10 nm to lower than 20 nm which are present per square area of 30 $\mu$m×30 $\mu$m is not greater than 4,000, the number ($M_{20}$) of projections having their heights in the range of form 20 nm to lower than 40 nm which are present per square area defined above is not smaller than 20, and the $M_{10}/M_{20}$ ratio is not greater than 25.

A reason why the aforesaid magnetic recording medium is obtained is that the dispersibility of a magnetic powder in the upper (coated) layer and the dispersibility of an inorganic fine powder in the lower (coated) layer are enhanced by using as a binder a particular polyurethane resin as mentioned above in a magnetic or non-magnetic layer to effect improvements in surface properties, especially a considerable reduction in the number of projections having the heights in the range of from 10 nm to lower than 20 nm when measured with AFM; as a result, an improving effect on electromagnetic characteristics is achieved.

Although a rise in friction coefficient is generally caused by smoothing the surface, the number of projections of 20 nm or more in height, which are formed by a solid lubricant (filler), hardly undergoes any change even when the aforementioned polyurethane resin is used; as a result, no rise in the friction coefficient is observed.

On the other hand, the conventional means to smooth the surface consists in enhancing the dispersibility, making the calendering conditions drastic and reducing the amount of solid lubricant added. According to this means, both high and low projections are merely increased or decreased in the same proportion, so that there is no other way than to grope for the best balanced point under the situation that an improvement in electromagnetic characteristics is accompanied by a rise in friction coefficient.

In contrast, the use of a particular polyurethane resin as specified by the present invention brings about improvement in the dispersed condition of fine magnetic and non-magnetic powders which have so far been insufficient in dispersibility, and thereby the number of low projections on the layer surface can be extremely reduced to effect an improvement in electromagnetic characteristics.

Additionally, when the polyurethane resin specified by the present invention has first diols having cyclic hydrocarbon groups as its constitutional units, it becomes possible to heighten the glass transition temperature thereof, and thereby the durability becomes more reliable.

Furthermore, it is desirable for the support of the present magnetic recording medium to have a back coat layer on the side opposite to the magnetic layer-provided side. The back coat layer comprises a binder and inorganic particles, including carbon black, dispersed therein. In a particularly preferred embodiment of the present invention, the number ($B_{100}$) of projections of at least 100 nm in height measured by the observation of the surface of the back coat layer with an atomic force microscope is from 50 to 3,000 per square area of 100 $\mu$m×100 $\mu$m. This embodiment can effectively prevent occurrence of a phenomenon that the roughness of the back coat layer surface is copied into the magnetic layer surface when a tape-shaped magnetic recording medium is wound onto a reel, and enables the magnetic recording medium to be free from deterioration in electromagnetic characteristics and to have excellent running durability even after long-range storage under a high temperature-high humidity condition.

Even when no back coat layer is provided, the effects similar to the above can be accomplished as far as the support surface on the side opposite to the magnetic layer-provided side has $B_{100}$ in the range of from 50 to 3,000.

With respect to advantages of the present invention, it can be thought that, since the polyurethane resin of the present invention can have rigidity due to presence of cyclic hydrocarbon groups therein, and further can have flexibility and improved solubility due to presence of ether linkages therein to result in extension of the inertia radius (stretching of molecular chains), it can have an elevated capacity to disperse powders therein and can acquire both hardness (high Tg and high Young's modulus) and elasticity (elongation) owing to the cyclic hydrocarbon groups; and, what is more, not only the copy of projections on the back side surface into the magnetic layer is prevented to improve the surface properties of the magnetic layer but also the running durability of the back side surface is secured by improving the surface characteristics on the back side as they are described below.

Also, the effect of the present invention described above can be obtained in the magnetic layer which is extremely influenced by the copy of projections on the back side surface into the magnetic layer, the magnetic recording medium having an extremely thin total-thickness, and the magnetic recording medium in which the thermo-processing is carried out upon producing the medium. Further, difference of output between inside and outside of bulk which is generated when the core side is extremely influenced, can be reduced.

More specifically, the surface characteristics on the back side can be acquired by controlling the number ($B_{100}$) of projections of at least 100 nm in height present in a square area of 100 $\mu$m×100 $\mu$m (namely an area of 10,000 $\mu$m$^2$) so as to be from 50 to 3,000. The expression "the surface on the back side" as used herein signifies the surface of a back coat layer when a non-magnetic support is provided therewith on the side opposite to the magnetic layer-provided side, or the surface on the back side of a non-magnetic support when the support has no back coat layer.

Consequently, projections on the back side surface are raised parts of the back coat layer surface, or those of the non-magnetic support surface in the back coat layer-free case.

Examples of the projections on the back coat layer include abrasives, solid lubricants, fine carbon black particles and binder components. More specifically, the projections on the back coat layer include projections mainly comprising solid lubricants, such as coarse carbon black and a calcium carbonate powder, or abrasives, and fine projections comprising aggregates of fine carbon black and those resulting from the surface roughness of a non-magnetic support used.

In the back coat layer-free case, the projections on the back side are projections on the surface of a non-magnetic support. Specifically, they include projections formed of a filler and fine projections formed of polyester aggregates.

In the present invention, it is preferable that $B_{100}$ be from 100 to 2,000, particularly from 300 to 1,000. Further, the number ($B_{200}$) of projections 200 nm or above in height present in a square area of 100 $\mu$m×100 $\mu$m is controlled to the range of generally from 2 to 500, preferably from 5 to 200, more preferably from 5 to 100.

When $B_{100}$ is below the aforesaid range, an increase in the coefficient of kinetic friction ($\mu$-value) at the time of a repeated running operation becomes great; while, when it is beyond the aforesaid range, the magnetic recording medium obtained cannot achieve sufficient effect for preventing a phenomenon that projections on the back side are copied into the magnetic layer surface.

As a specific means to control $B_{100}$ to the foregoing range, the following can be adopted:

a. Case of providing a back coat layer (Means-1): A non-magnetic powder is added to a binder, and further the particle size and addition amount thereof and the thickness of the back coat layer are each chosen properly.

More specifically, a coating composition prepared by dispersing a mixture of a fine non-magnetic powder having an average particle size of from 10 to 30 nm with a coarse non-magnetic powder having an average particle size of from 100 to 300 nm in a binder together with an organic solvent is coated in a layer having a dry thickness of from 0.1 to 2 $\mu$m on the back side of a non-magnetic support.

Examples of a non-magnetic powder which can be used, include carbon black, $Al_2O_3$, $Cr_2O_3$, $\alpha$-$Fe_2O_3$, tungsten disulfide, boron nitride, $SiO_2$, $CaCO_3$ and $TiO_2$. Of these powders, carbon black is preferred as a fine non-magnetic powder; while carbon black and $Al_2O_3$ are preferred as a coarse non-magnetic powder.

In mixing the fine non-magnetic powder and the coarse non-magnetic powder, the latter is generally used in an amount of from 0.2 to 20 parts by weight per 100 parts by weight of the former.

The total amount of non-magnetic powders used is generally from 0.1 to 4.0 parts by weight per 100 parts by weight of binder.

As the binder, any of conventional thermoplastic resins, thermosetting resins and reactive resins may be used. For instance, a vinyl chloride homopolymer resin, a vinyl chloride-vinyl acetate copolymer resin, a cellulose resin such as nitrocellulose, a phenoxy resin, or the combined use of a polyurethane resin (including the polyurethane resin of the present invention) and an isocyanate hardener is preferably used.

(Means-2): The surface characteristics of a non-magnetic support on the side provided with a back coat layer are properly adjusted, and further a coating composition for the back coat layer is applied in a dry thickness of from 0.2 to 1 $\mu$m. Therein, the back coat layer may not contain any powder, but may consist of a binder.

As proper adjustment of the surface characteristics of a non-magnetic support used, H1 is adjusted generally to the range of 20 to 500, preferably to the range of 30 to 200, and H2 generally to 30 or below, preferably to 10 or below. Herein, H1 means the number density of fish eyes (FE) having a height of from 0.273 $\mu$m to less than 0.546 $\mu$m, which generate single-ring interference fringes when the support surface is irradiated with a light ray having the wavelength of 0.273 $\mu$m, expressed in terms of the number of such the interference fringes per 100 $cm^2$, and H2 means the number density of FE having a height of 0.546 $\mu$m or above, which generate double-ring interference fringes when the support surface is irradiated with a light ray having the wavelength of 0.273 $\mu$m, expressed in terms of the number of such interference fringes per 100 $cm^2$.

b. Case of providing no back coat layer (Means-1): A non-magnetic support having H1 and H2, which are defined in the description of Means-2 in the above Case "a", adjusted to the range of generally 30 to 200, preferably 50 to 120, and the range of generally 0 to 10, preferably 0 to 5, respectively is used, and thereby $B_{100}$ of the non-magnetic support used can be adjusted to the range specified by the present invention.

The control of H1 and H2 in the above Case "a" and Case "b" can be achieved by properly choosing the size, proportion and kind of organic resin particles admixed with the base resin to constitute a non-magnetic support. As the organic resin particles admixed, those having affinity for the non-magnetic support are desirable, with specific examples including polystyrene particles, cross-linked polystyrene particles and styrene-acrylic resin particles.

The average size of those organic resin particles is generally from 0.03 to 1.0 $\mu$m, preferably from 0.1 to 0.8 $\mu$m, in the Means-2 of Case "a", and that in Case "b" is generally from 0.03 to 0.8 $\mu$m, preferably from 0.1 to 0.4 $\mu$m. In both cases, the organic resin particles are used in a proportion of from 0.01 to 1.0 weight % to the base resin.

The non-magnetic supports in Case "a" and Case "b" each can have two or at least three constituent layers on both sides of the back side and magnetic layer side.

The present invention will now be illustrated in more detail by reference to the following examples and comparative examples. More specifically, the magnetic recording media as shown below are prepared and examined for their respective characteristics. Additionally, in those examples, all parts and percentages are by weight unless otherwise indicated.

SYNTHESIS EXAMPLE 1

Synthesis of Polyurethane Resin A

The vessel equipped with a reflux condenser and a stirrer was first filled with nitrogen, and then the monomer components described below and the cyclohexanone/dimethylacetamide (50/50 by weight) mixed solvent were placed therein, and further heated to 60° C. under a stream of nitrogen in order to make them a solution. To this solution was added di-n-dibutyltin dilaurate as a catalyst in a proportion of 60 ppm to the total weight of the raw materials used.

(Composition components of Monomers)

HBpA: Hydrogenated bisphenol A (Rikabinol HB, trade name, a product of Shin-Nippon Rika)

BpA-PP0700: Polypropylene oxide adduct of bisphenol A (molecular weight: 700)

PPG400: Polypropylene glycol (molecular weight: 400)

DEIS: Sodium salt of bis(2-hydroxyethyl) sulfoisophthalate (trade name, a product of Taoka Chemical Co., Ltd.)

The ratio of HBpA/BpA-PP0700/PPG400/DEIS in the composition of monomers was 24/4/20/2 by mole.

To the aforementioned solution was furthermore added 4,4'-diphenylmethanediisocyanatge (MDI) in such an amount that the ratio between MDI and the foregoing composition was 50/50 by mole, and therein the reaction was run for 6 hours while heating at 90° C. The thus prepared polyurethane resin was named Polyurethane Resin A. The weight average molecular weight of Polyurethane Resin A was 40,000, and the number average molecular weight thereof was 16,000. And the quantity of the ether linkages brought from BpA-PP0700 (second diol) into Polyurethane Resin A was 1 mmol per g of Polyurethane Resin A.

SYNTHESIS EXAMPLE 2

Synthesis of Polyurethane Resin B 641 parts of the polyesterdiol having a molecular weight of 800, which was prepared from 1,4-butanediol glycol and adipic acid, and 8.8 g of dimethylol propionic acid were dissolved in 1687 parts of cyclohexanone, admixed with 83 parts of 2,2-dimethyl-1,3-propanediol, rendered homogeneous, and further admixed with 0.5 parts of dibutyltin dilaurate. Thereto, 400 parts of 4,4'-diphenylmethane diisocyanate (MDI) was furthermore added, and therein the reaction was run while heating at 80° C. After the completion of the reaction, 1687 parts of methyl ethyl ketone (MEK) was added to give a polyurethane resin solution having a nonvolatile matter concentration of 25% (Polyurethane Resin B).

SYNTHESIS EXAMPLE 3

Synthesis of Polyurethane Resin C

The vessel equipped with a reflux condenser and a stirrer was first filled with nitrogen, and then HBpA as the first diol, BpA-PP0700 as the second diol, DEIS and other diols (PCL400 and/or PPG400) in the molar ratio shown in Table 1 and the cyclohexanone/dimethylacetamide (50/50 by weight)-mixed solvent were placed therein, and further heated to 60° C. under a stream of nitrogen in order to make them a solution. To this solution was added di-n-dibutyltin dilaurate as a catalyst in a proportion of 60 ppm to the total weight of the raw materials used.

To the aforementioned solution was furthermore added a diisocyanate compound (MDI) in the amount shown in Table 1, and therein the reaction was run for 6 hours while heating at 90° C. In the thus prepared polyurethane resin named Polyurethane Resin C, —$SO_3Na$ group was introduced in an amount of $8 \times 10^{-5}$ mole/g. The weight average molecular weight of Polyurethane Resin C was 45,000, and the number average molecular weight thereof was 25,000.

SYNTHESIS EXAMPLE 4

Synthesis of Polyurethane Resins D to I

Polyurethane Resins D to I were synthesized in the same manner as Polyurethane Resin C, except that the monomer compositions were changed as shown in Table 1 respectively.

SYNTHESIS EXAMPLE 5

Synthesis of Polyurethane Resin J

Polyurethane Resin J was synthesized in the same manner as Polyurethane Resin C, except that the monomer composition was changed as shown in Table 1.

SYNTHESIS EXAMPLE 6

Synthesis of Polyurethane Resin K

Polyurethane Resin K was synthesized in the same manner as described in Example 1 of U.S. Pat. No. 5,153,071, wherein the polyol prepared by addition reaction of ethylene dioxide with bisphenol A and 4,4'-diphenylmethanediisocyanate as a polyisocyanate component were used.

TABLE 1

| Poly-urethane Resin | Composition of Polyurethane Resin | | | | | | | | Content of ether group from | Content of polar group |
|---|---|---|---|---|---|---|---|---|---|---|
| | HBpA (first diol) | | BpA-PP0700 (second diol) | | PCL400 | PPG400 | DEIS | MDI (diisocyanate) | | |
| | molar ratio | weight % | molar ratio | weight % | molar ratio | molar ratio | molar ratio | molar ratio | 2nd diol [mmol/g] | (—$SO_3Na$) [eg/g] |
| C | 24 | 20 | 14 | 40 | 0 | 10 | 2 | 50 | 4.0 | $8 \times 10^{-5}$ |
| D | 24 | 20 | 5 | 15 | 14 | 5 | 2 | 50 | 1.3 | $8 \times 10^{-5}$ |
| E | 36 | 30 | 8 | 24 | 4 | 0 | 2 | 50 | 2.3 | $8 \times 10^{-5}$ |
| F | 36 | 30 | 6 | 18 | 6 | 0 | 2 | 50 | 1.5 | $8 \times 10^{-5}$ |
| G | 36 | 30 | 6 | 18 | 0 | 6 | 2 | 50 | 1.5 | $8 \times 10^{-5}$ |
| H | 19 | 15 | 4 | 10 | 0 | 25 | 2 | 50 | 1 | $8 \times 10^{-5}$ |
| I | 12 | 19 | 12 | 38 | 18 | 6 | 2 | 50 | 3 | $8 \times 10^{-5}$ |
| J | — | — | — | — | 14 | 34 | 2 | 50 | — | $8 \times 10^{-5}$ |
| K | 48 | 40 | — | — | 0 | 2 | 0 | 50 | — | — |

Polyurethane Resins C to I are within the scope of the present invention, while Polyurethane Resins J and K are outside the scope of the present invention.

The abbreviations used in Table 1 are as follows: HBpA, hydrogenated bisphenol A (Rikabinol HB, trade name, a product of New Japan Chemical Co., Ltd.); BpA-PP0700, polypropylene oxide adduct of bisphenol A (molecular weight: 700); PCL400, polycaprolactone polyol (molecular weight: 400); PPG400, polypropylene glycol (molecular weight: 400); DEIS, sodium salt of bis(2-hydroxyethyl)

sulfoisophthalate (trade name, a product of Taoka Chemical Co., Ltd.); and MDI, 4,4-diphenylmethanediisocyanate.

EXAMPLE 1

A magnetic recording medium having a single magnetic layer was prepared as follows:

| Magnetic Coating Composition | Parts |
|---|---|
| Ferromagnetic metal alloy fine powder | 100 |
| Composition: Fe/Co atomic ratio, 100/30; | |
| Al, 7 atomic %; Y, 6 atomic % | |
| Hc: 2450 Oe | |
| Specific surface area determined by | |
| BET method ($S_{BET}$): 45 m$^2$/g | |
| Crystallite size: 220Å | |
| Particle size (major-axis length): 0.18 μm | |
| Acicular ratio (long axis/short axis): 10:1 | |
| $\sigma_s$: 155 emu/g | |
| Vinyl chloride copolymer | 10 |
| (MR-110, trade name, produced by Nippon | |
| Zeon Co., Ltd.) | |
| Polyurethane Resin A | 6 |
| α-Al$_2$O$_3$ (average particle size: 0.15 μm) | 5 |
| Carbon black (average particle size: 0.08 μm) | 0.5 |
| Butyl stearate | 1 |
| Stearic acid | 5 |
| Methyl ethyl ketone | 90 |
| Cyclohexanone | 30 |
| Toluene | 60 |

The above-described composition was kneaded with an open kneader, and then dispersed with a sand mill. The dispersion obtained was admixed with 5 parts of polyisocyanate (Coronate L, trade name, produced by Nippon Polyurethane Co., Ltd.) and 40 parts of a methyl ethyl ketone-cyclohexanone-mixed solvent, and filtered through a filter having an average pore size of 1 μm to prepare a magnetic coating composition.

The magnetic coating composition was coated on a 6.5 μm-thick polyethylene naphthalate (PEN) support in a dry thickness of 1.5 μm. The support used herein had a center-line surface roughness of 0.0015 μm on the magnetic layer-provided side. While the composition coated was still in a wet condition, it was oriented by means of, in succession, a cobalt magnet having a magnetic force of 5000 Gauss and a solenoid having a magnetic force of 6000 Gauss. Then, the resulting material was dried and further processed with a 7-stage calender constituted of metal rolls and epoxy resin rolls at a rate of 200 m/min at a temperature of 100° C. Thereafter, the back coat layer-forming composition described below was coated on the back side of the support in a dry thickness of 0.5 μm. The thus prepared magnetic recording material was slit into video tapes of a width of 8 mm.

| Back Coat Layer Forming Composition | Parts |
|---|---|
| Fine-grain carbon black | 100 |
| (BP-800, trade name, produced by Cabot Corp.; | |
| average particle size, 17 μm) | |
| Coarse-grain carbon black | 10 |
| (Thermal Black, produced by Cancarb Corp.; | |
| average particle size, 270 mμ) | |
| α-iron oxide | 15 |
| (TF100, trade name, produced by Toda Kogyo Corp.; | |
| average particle size, 110 mμ; Mohs' hardness, 5.5) | |
| Nitrocellulose resin | 140 |

| Back Coat Layer Forming Composition | Parts |
|---|---|
| Polyurethane resin | 15 |
| (N2301, trade name, produced by Nippon | |
| Polyurethane Co., Ltd.) | |
| Polyisocyanate | 40 |
| (Coronate L, trade name, produced by Nippon | |
| Polyurethane Co., Ltd.) | |
| Polyester resin | 5 |
| Dispersing agent: Copper oleate | 5 |
| Copper phthalocyanine | 5 |
| Barium sulfate | 5 |
| Methyl ethyl ketone | 2200 |
| Butyl acetate | 300 |
| Toluene | 600 |

EXAMPLE 2

A magnetic recording medium was prepared in the same manner as in Example 1, except that the ferromagnetic metal alloy fine powder described below was used as the magnetic material:

Ferromagnetic metallic alloy fine powder (100 parts)
  Composition: Fe/Co (atomic ratio), 100/30; Al, 11 atomic %; Si, 0.2 atomic %; Y, 6.7 atomic %
  Hc: 2350 Oe
  $S_{BET}$: 49 m$^2$/g
  Crystallite size: 160 Å
  Particle size (major-axis length): 0.09 μm
  Acicular ratio: 7
  $\sigma_s$: 145 emu/g

EXAMPLE 3

A magnetic recording medium was prepared in the same manner as in Example 1, except that the ferromagnetic metal alloy fine powder described below was used as the magnetic material:

Ferromagnetic metal alloy fine powder (100 parts)
  Composition: Fe/Co (atomic ratio), 100/30; Al, 7 atomic %; Si, 0.5 atomic %; Y, 8.1 atomic %
  Hc: 2250 Oe
  $S_{BET}$: 53 m$^2$/g
  Crystallite size: 120 Å
  Particle size (major-axis length): 0.06 μm
  Acicular ratio: 6
  $\sigma_s$: 140 emu/g

COMPARATIVE EXAMPLE 1

A magnetic recording medium was prepared in the same manner as in Example 1, except that the ferromagnetic metal alloy fine powder described below was used as the magnetic material:

Ferromagnetic metal alloy fine powder (100 parts)
  Composition: Fe/Co (atomic ratio), 100/30; Al, 4.2 atomic %; Si, 1.0 atomic %; Y, 2.5 atomic %
  Hc: 2350 Oe
  $S_{BET}$: 45 m$^2$/g
  Crystallite size: 240 Å
  Particle size (major-axis length): 0.2 μm
  Acicular ratio: 8
  $\sigma_s$: 150 emu/g

COMPARATIVE EXAMPLE 2

A magnetic recording medium was prepared in the same manner as in Example 1, except that the ferromagnetic metal alloy fine powder described below was used as the magnetic material:

Ferromagnetic metal alloy fine powder (100 parts)
  Composition: Fe/Co (atomic ratio), 100/30; Al, 19 atomic
  % Si, 0.2 atomic %; Y, 12 atomic %
  Hc: 2050 Oe 175°, with a load of 20 g and at a sliding rate of 14 mm/sec. The measurement was repeated 100 times on the same area, and the highest of the measured values was chosen in calculating the $\mu$-value.

TABLE 2

|  | Example 1 | Example 2 | Example 3 | Compar. ex. 1 | Compar. ex. 2 | Compar. ex. 3 | Compar. ex. 4 | Compar. ex. 5 |
| --- | --- | --- | --- | --- | --- | --- | --- | --- |
| Major-axis length of magnetic powder ($\mu$m) | 0.18 | 0.09 | 0.06 | 0.2 | 0.04 | 0.18 | 0.09 | 0.2 |
| Crystallite size (Å) | 220 | 160 | 120 | 240 | 95 | 220 | 160 | 240 |
| Type of polyurethane resin (binder) | A | A | A | A | A | B | B | B |
| SQ | 0.9 | 0.88 | 0.87 | 0.9 | 0.8 | 0.89 | 0.85 | 0.9 |
| SFD | 0.26 | 0.39 | 0.46 | 0.26 | 0.88 | 0.26 | 0.39 | 0.27 |
| 7.6 MHz Output | 6 | 8 | 8.1 | 4.1 | 2 | 4.8 | 4.4 | 4.8 |
| CNR | 6.7 | 7.7 | 8.3 | 4.8 | 1.6 | 3 | 2.7 | 4.9 |
| $\mu$-value | 0.32 | 0.32 | 0.33 | 0.31 | 0.38 | 0.36 | 0.32 | 0.3 |

$S_{BET}$: 59 m$^2$/g
Crystallite size: 95 Å
Particle size (major-axis length): 0.04 $\mu$m
Acicular ratio: 4
$\sigma_s$: 125 emu/g COMPARATIVE EXAMPLES 3, 4 and 5

Magnetic recording madia were prepared in the same manner as in Example 1, Example 2 and Comparative Example 1 respectively, except that Polyurethane Resin B was used in place of Polyurethane Resin A.

The magnetic recording media prepared in Examples 1 to 3 and Comparative Examples 1 to 5 were each examined for their individual characteristics according to the measuring methods described below, and the results obtained are shown in Table 2.

[Measuring Methods]

1) B-H characteristics:

The B-H characteristics of each magnetic recording medium were determined using a vibrating sample type magnetometer (VSM), made by Toei Kogyo Co., Ltd., in the external magnetic field of 10 kOe. The term "SQ" refers to the ratio of a residual magnetic flux density (Br) to a maximum magnetic flux density (Bm). The term "SFD" means Switching Field Distribution, and it is a value obtained by dividing the half (value) width of the peak in a differentiated hysteresis curve by Hc, so that it is an indication of Hc distribution.

2) 7.6 MHz Output:

Signals of 7.6 MHz were recorded on each magnetic recording medium with a deck, EV-S900, made by SONY Corp. When reproducing these recorded signals, the output thereof was measured with an oscilloscope.

3) CNR:

Signals of 7.6 MHz were recorded on each magnetic recording medium with a deck, EV-S900, made by SONY Corp. In reproducing these recorded signals, the noise generating at 6.6 MHz was measured with a spectrum analyzer, and the ratio of the reproduced signal to this noise was determined.

4) Coefficient of Kinetic Friction ($\mu$-value):

The $\mu$-value was determined using a IEC type $\mu$-value measuring device, wherein the friction of each magnetic recording medium against a SUS420J stainless rod having a diameter of 4 mm was measured at a wrapping angle of As is apparent from the results shown in Table 2, it has been confirmed that the magnetic recording media prepared in Examples 1 to 3 were excellent in all the characteristics, namely SQ, SFD, 7.6 MHz output, CNR and $\mu$-value. On the other hand, the magnetic recording media prepared in Comparative Examples 1 to 5 were inferior in 7.6 MHz output and CNR to those prepared in Examples 1 to 3 although their SQ values and $\mu$-value had the same level as those of the magnetic recording media prepared in Examples 1 to 3. It is clearly seen from an additional comparison between Comparative Example 1 and Comparative Example 5, that when the particle size of a magnetic powder was outside the range specified by the present invention, no appreciable improvement in characteristics was produced even by use of the binder specified by the present invention.

EXAMPLE 4

A magnetic recording medium having a non-magnetic undercoat layer in addition to a magnetic uppercoat layer was prepared in the following manner:

The same magnetic composition as in Example 2 was prepared for forming the upper-coat layer.

The non-magnetic composition for forming the undercoat layer was constituted of the ingredients shown below;

| | |
| --- | --- |
| Non-magnetic powder | 80 parts |
| $\alpha$-Fe$_2$O$_3$ (hematite) | |
| [major-axis length, 0.15 $\mu$m; S$_{BET}$, 52 m$^2$/g; pH, 8; tapping density, 0.8; DBP oil absorption, 27–38 g/100 g; surface-covering compound, Al$_2$O$_3$ and SiO$_2$] | |
| Carbon black | 20 parts |
| [average size of primary particles, 16 m$\mu$; DBP oil absorption, 80 ml/100 g; pH, 8.0; S$_{BET}$, 250 m$^2$/g; volatile content, 1.5 %] | |
| Vinyl chloride copolymer | 12 parts |
| [MR-110, trade name, produced by Nippon Zeon Co., Ltd.] | |
| Polyurethane Resin A | 5 parts |
| $\alpha$-Al$_2$O$_3$ (average particle size: 0.2 $\mu$m) | 1 part |
| Butyl stearate | 1 part |
| Stearic acid | 1 part |
| Methyl ethyl ketone | 100 parts |
| Cyclohexanone | 50 parts |
| Toluene | 50 parts |

Each of the above-described compositions was kneaded with an open kneader, and then dispersed with a sand mill.

The undercoat dispersion obtained was admixed with 5 parts of polyisocyanate (Coronate L, trade name, produced by Nippon Polyurethane Co., Ltd.). To each of the resulting dispersions, 40 parts of a methyl ethyl ketone-cyclohexanone mixed solvent was further added, and then filtered through a filter having an average pore size of 1 μm. Thus, coating compositions for forming an undercoat layer and a magnetic layer were prepared separately.

On a 5.2 μm-thick polyethylene naphthalate support having a center-line surface roughness of 0.001 μm on the magnetic layer-provided side, those coating compositions were coated using a simultaneous double-layer coating method so that the undercoat layer had a dry thickness of 1.5 μm and immediately the magnetic layer provided thereon had a dry thickness of 0.2 μm. The resulting layer was oriented by means of, in succession, a cobalt magnet having a magnetic force of 5000 Gauss and a solenoid having a magnetic force of 4000 Gauss while the compositions coated were still in a wet condition, and then dried. Further, it was processed with a 7-stage calender constituted of metal rolls and epoxy resin rolls at a rate of 200 m/min at a temperature of 100° C. Thereafter, the same back coat layer-forming composition as in Example 1 was coated on the back side of the support in a dry thickness of 0.5 μm. The thus prepared magnetic recording medium was slit into video tapes of a width of 8 mm.

EXAMPLE 5

A magnetic recording medium was prepared in the same manner as in Example 4, except that the Polyurethane Resin A in the magnetic upper layer was replaced by Polyurethane Resin B.

EXAMPLE 6

A magnetic recording medium was prepared in the same manner as in Example 4, except that the Polyurethane Resin A in the non-magnetic undercoat layer was replaced by Polyurethane Resin B.

COMPARATIVE EXAMPLE 6

A magnetic recording medium was prepared in the same manner as in Example 4, except that the Polyurethane Resin B was incorporated instead of the Polyurethane Resin A in both the magnetic upper layer and the non-magnetic undercoat layer.

The magnetic recording media prepared in Examples 4 to 6 and Comparative Example 6 were each examined for their individual characteristics according to the aforementioned measuring methods, and the results obtained are shown in Table 3.

TABLE 3

| | Example 4 | Example 5 | Example 6 | Comparative Example 6 |
|---|---|---|---|---|
| Major-axis length of magnetic powder (μm) | 0.09 | 0.09 | 0.09 | 0.09 |
| Crystallite size (Å) | 160 | 160 | 160 | 160 |
| Type of polyurethane resin in magnetic upper layer | A | B | A | B |
| Thickness of magnetic layer (μm) | 0.2 | 0.2 | 0.2 | 0.2 |
| Type of polyurethane resin in non-magnetic undercoat layer | A | A | B | B |
| SQ | 0.9 | 0.89 | 0.9 | 0.84 |
| SFD | 0.35 | 0.32 | 0.35 | 0.42 |
| 7.6 MHz Output | 9.9 | 9.2 | 9 | 7.2 |
| CNR | 10.5 | 9.5 | 9.5 | 6.5 |
| μ-value | 0.25 | 0.25 | 0.29 | 0.29 |

As is apparent from the results shown in Table 3, it has been confirmed that the magnetic recording media prepared in Examples 4 to 6 were excellent in all the characteristics, namely SQ, SFD, 7.6 MHz output, CNR and μ-value. On the other hand, the magnetic recording medium prepared in Comparative Example 6 was inferior in 7.6 MHz output and CNR to those prepared in Examples 4 to 6 although its SQ value and μ-value had the same level as those of the magnetic recording media prepared in Examples 4 to 6. Additionally, the characteristics of the magnetic recording medium prepared in Comparative Example 6 were excellent as compared with those of the magnetic recording medium as prepared in Example 1. This indicates that muitilayer-coated magnetic recording materials are superior in characteristics to single magnetic layer-coated magnetic recording media. Therefore, it is seen that the magnetic recording medium of Comparative Example 6 is inferior to the multilayer-coated magnetic recording media of Examples 4, 5 and 6 in characteristics.

EXAMPLES 7 TO 19, REFERENCE EXAMPLES 1 TO 6, AND COMPARATIVE EXAMPLES 7 AND 8

| | Parts |
|---|---|
| Magnetic Composition (a) for Single or Magnetic Upper Layer | |
| Ferromagnetic Fe—Co alloy powder [Fe/Co atomic ratio, 100/30; Al, 4 atomic %; Y, 4 atomic %; Hc, 2300 Oe; $\sigma_s$, 140 emu/g; $S_{BET}$, 52 m²/g; major-axis length, 0.1 μm; crystallite size, 160 Å; pH, 9] | 100 |
| Aromatic organic acid compound | shown in Tables 4 and 5 |
| Polyurethane resin (shown in Tables 1, 4 and 5) | 8 |
| Vinyl chloride copolymer (MR-110, trade name, produced by Nippon Zeon Co., Ltd.) | 10 |
| Carbon black (average particle size: 80 nm) | 1 |
| Alumina (average particie size: 0.2 μm) | 5 |
| Stearic acid | 0.5 |
| Butyl stearate | 1.2 |
| Polyisocyanate (Coronate L, trade name, produced by Nippon Polyurethane Co., Ltd.) | 6 |
| Methyl ethyl ketone | 120 |
| Cyclohexanone | 120 |
| Non-magnetic Composition (a) for Undercoat Layer | |
| Non-magnetic powder $TiO_2$ [average particle size, 35 nm; $S_{BET}$, 40 m²/g; surface-treated with Al compound; $TiO_2$ content, at least 90%; pH, 7.5] | 100 |
| Aromatic organic acid compound | shown in Table 5 |
| Polyurethane resin (shown in Tables 1 and 5) | 8 |
| Vinyl chloride copolymer (MR-110, trade name, produced by Nippon Zeon Co., Ltd.) | 10 |

-continued

| | Parts |
|---|---|
| Carbon black (average particle size: 20 nm) | 15 |
| Alumina (average particle size: 0.2 μm) | 10 |
| Stearic acid | 0.5 |
| Butyl stearate | 1.2 |
| Polyisocyanate | 6 |
| (Coronate L, trade name, produced by Nippon Polyurethane Industry Co., Ltd.) | |
| Methyl ethyl ketone | 120 |
| Cyclohexanone | 120 |
| Magnetic Composition (b) for Undercoat Layer | |
| Co-modified magnetite | 100 |
| [Co, 3 weight %; Al, 1.5 weight %; Si, 0.8 weight %; Hc, 850 Oe; $\sigma_s$, 80 emu/g; $S_{BET}$, 35 m$^2$/g; major-axis length, 0.25 μm; crystallite size, 230 Å; pH, 8.4] | |
| Aromatic organic acid compound (benzoic acid) | 4.5 |
| Polyurethane resin (shown in Tables 1 and 5) | 8 |
| Vinyl chloride copolymer | 10 |
| (MR-110, trade name, produced by Nippon Zeon Co., Ltd.) | |
| Carbon black (average particle size: 20 nm) | 15 |
| Alumina (average particle size: 0.2 μm) | 10 |
| Stearic acid | 0.5 |
| Butyl stearate | 1.2 |
| Polyisocyanate | 6 |
| (Coronate L, trade name, produced by Nippon Polyurethane Co., Ltd.) | |
| Methyl ethyl ketone | 120 |
| Cyclohexanone | 120 |
| Soft Magnetic Composition (c) for Undercoat Layer | |
| Granulated magnetite | 100 |
| [average granule size, 50 nm; $S_{BET}$, 20 m$^2$/g; oil absorption (DBPA), 20 cc/100 g; pH, 9.0] | |
| Aromatic organic acid compound (sodium benzenesulfonate) | 4.5 |
| Polyurethane resin (shown in Tables 1 and 5) | 8 |
| Vinyl chloride copolymer | 10 |
| (MR-110, trade name, produced by Nippon Zeon Co., Ltd.) | |
| Carbon black (average particle size: 20 nm) | 15 |
| Alumina (average particle size: 0.2 μm) | 10 |
| Stearic acid | 0.5 |
| Butyl stearate | 1.2 |
| Polyisocyanate | 6 |
| (Coronate L, trade name, produced by Nippon Polyurethane Co., Ltd.) | |
| Methyl ethyl ketone | 120 |
| Cyclohexanone | 120 |

Magnetic recording media for Examples 7 to 14, Reference Examples 1 to 5 and Comparative Example 7 were each prepared as follows:

The ingredients constituting the aforementioned Magnetic Composition (a) were kneaded and dispersed, and further filtered through a filter having an average pore size of 1 μm to prepare a magnetic coating composition.

The obtained composition was coated on a 10 μm-thick polyethylene naphthalate support in a dry thickness of 2.5 μm by means of a reverse roll. While the magnetic coating composition coated on the non-magnetic support was still in a wet condition, it was oriented by means of a magnet having a magnetic force of 3000 Gauss. Then, the resulting composition was dried, and further subjected to a calender roll process using the 7-stage combination of metal rolls at a processing rate of 100 m/min, under a linear pressure of 300 Kg/cm and at a temperature of 90° C. The thus prepared magnetic recording medium was slit into tapes of a width of 8 mm.

Magnetic recording media for Examples 15 to 19, Reference Example 6 and Comparative Example 8 were each prepared as follows:

The ingredients constituting the aforementioned Non-magnetic Composition (a), Magnetic Composition (b), or Soft Magnetic Composition (c) for an undercoat layer were kneaded and dispersed, and further filtered through a filter having an average pore size of 1 μm to prepare a coating composition.

On a 10 μm-thick polyethylene naphthalate support, the coating composition prepared above was coated by means of a reverse roll in a dry thickness of 2.0 μm in the case of using Non-magnetic Composition (a), 2.5 μm in the case of using Magnetic Composition (b), or 2.0 μm in the case of using Soft Magnetic Composition (c), thereby forming an undercoat layer. Immediately thereafter, the coating composition prepared from Magnetic Composition (a) was coated on the undercoat layer in a dry thickness of 0.2 μm in a case where the undercoat layer was formed from Non-magnetic Composition (a), 0.5 μm in a case where the undercoat layer was formed from Magnetic Composition (b), or 0.2 μm in a case where the undercoat layer was formed from Soft Magnetic Composition (c). Further, the double-coated medium thus obtained was subjected to the same orientation and calendering processes as the magnetic recording medium of Example 7.

The present and comparative magnetic recording materials prepared in the above-described manners were examined for their individual characteristics according to the measuring methods described below, and the results obtained are shown in Table 4 and 5.

[Measuring Methods]

1) Ra; The average roughness determined under the condition of cut off value=0.25 mm in the photo-interference method using a digital optical profimeter (made by WYKO) was defined as Ra.

2) Reproduced output ($\lambda$=0.5 μm); Signals of 7 MHz were recorded and reproduced on each sample tape using a VTR (Model TR705, made by SONY Corp.). The reproduced output of the 7 MHz signals recorded on the standard magnetic tape obtained in Reference Example 1 was taken as 0 dB. The reproduced output data of other sample tapes shown in Tables 4 and 5 are relative values, with the standard magnetic tape being taken as 0 dB.

3) Change in output after 1000-pass running (tape durability upon repeated running); Each sample tape having a length of 60-minute recording was set in a VTR (Model TR705, made by SONY Corp.), and made to run repeatedly for 1,000 times (in other words, underwent 1000-pass running) in the atmosphere of 40° C.-80% RH. The output in the first running was taken as 0 dB, and the lowering of output due to the running repeated 1,000 times was measured.

Additionally, the mark *1 in Table 4 means that the output disappeared when the sample tape was made to run repeatedly for 150 times, and the mark *2 in Table 4 means that the output disappeared when the sample tape was made to run repeatedly for 200 times.

TABLE 4

| Sample Tape | Magnetic Layer | | | | Ra (nm) | Reproduced Output (λ = 0.5 μm) (dB) | Change in Output by 1000-Pass Running (dB) |
|---|---|---|---|---|---|---|---|
| | Magnetic Compsn. | Polyurethane Resin | Aromatic Organic Acid Compound | | | | |
| | | | species | Content (mol/kg) | | | |
| Example 7 | a | C | phenylphosphonic acid | 0.19 | 1.8 | 2.2 | −1 |
| Example 8 | a | D | phenylphosphonic acid | 0.06 | 2 | 1.5 | −0.5 |
| Example 9 | a | E | phenylphosphonic acid | 0.19 | 1.9 | 1.7 | −0.6 |
| Example 10 | a | F | phenylphosphonic acid | 0.32 | 2.1 | 1.4 | −0.2 |
| Example 11 | a | G | phenylphosphonic acid | 0.19 | 2.1 | 1.4 | −0.2 |
| Example 12 | a | C | Sodium benzenesulfonate | 0.13 | 1.9 | 1.6 | −0.7 |
| Example 13 | a | C | benzoic acid | 0.37 | 2.2 | 1.4 | −1 |
| Example 14 | a | C | phenylphosphoric acid | 0.19 | 1.8 | 1.5 | −0.4 |
| Reference Example 1 | a | H | — | — | 3.4 | 0 | *1 |
| Reference Example 2 | a | C | — | — | 2.7 | 0.5 | −4.5 |
| Reference Example 3 | a | D | — | — | 2.6 | 0.8 | −3.6 |
| Reference Example 4 | a | E | — | — | 2.8 | 0.6 | −4.2 |
| Reference Example 5 | a | F | — | — | 2.7 | 0.4 | −3.3 |
| Comparative Example 7 | a | J | phenylphosphonic acid | 0.19 | 3.8 | −0.3 | *2 |

TABLE 5

| Sample Tape | Upper Magnetic Layer | | | Coating Compsn. | Undercoat Layer | | | Ra (mn) | Reproduced Output (λ = 0.5 μm) (dB) | Change in Output by 1000-Pass Running (dB) |
|---|---|---|---|---|---|---|---|---|---|---|
| | Polyurethane Resin | Organic Acid Compound | | | Polyurethane Resin | Organic Acid Compound | | | | |
| | | Species | Content (mol/kg) | | | species | Content (mol/kg) | | | |
| Ex. 15 | C | phenylphosphonic acid | 0.19 | a | C | phenylphosphonic acid | 0.19 | 1.8 | 3.6 | −0.3 |
| Ex. 16 | C | phenylphosphonic acid | 0.19 | b | C | benzoic acid | 0.37 | 2.1 | 1.6 | −0.7 |
| Ex. 17 | C | phenylphosphonic acid | 0.19 | c | C | sodium benzenesulfonate | 0.13 | 2 | 1.8 | −1 |
| Ex. 18 | C | phenylphosphonic acid | 0.19 | a | I | phenylphosphonic acid | 0.19 | 2 | 3.2 | −0.6 |
| Ex. 19 | C | phenylphosphonic acid | 0.19 | a | K | — | — | 2.0 | 3.4 | −0.3 |
| Ref. Ex. 6 | C | — | — | a | C | — | — | 2.7 | 1.2 | −5 |
| Compr. Ex. 8 | K | — | — | a | K | — | — | 3.2 | 0 | −7.2 |

*Magnetic Composion a is used for the upper magnetic layer in Table 5.

The data set forth in Table 4, which concern magnetic recording media having a single-layer structure, demonstrate that the sample tapes of Examples 7 to 14, each of which contains one of the polyurethane resins C to G of the present invention and an aromatic organic acid compound in combination, are superior in reproduced output and running durability to the sample tapes of Reference Examples 1 to 5, each of which contains no aromatic organic acid compound although the polyurethane resin of the present invention is contained therein, and the sample tape of Comparative Example 7 wherein a polyurethane resin which is outside the scope of the present invention and an aromatic organic acid are contained.

On the other hand, the data shown in Table 5, which concern magnetic recording media having a double-layer structure, demonstrate that the sample tapes of Examples 15 to 18, each of which contains the polyurethane resin C of the present invention and an aromatic organic acid compound in both magnetic upper layer and undercoat layer, are superior in reproduced output and running durability to the sample tape of Reference Example 6, which contains no aromatic organic acid compound in both layers although the polyurethane resin of the present invention is contained in both layers, and the sample tape of Comparative Example 8 which contains a polyurethane resin which is outside the scope of the present invention in both layers. Further, the sample tape of Example 19 which contains the polyurethane resin of the present invention and an aromatic organic acid compound in the magnetic upper layer alone proves to be superior in characteristics to the sample tape of Comparative Example 8.

EXAMPLES 20 TO 28, REFERENCE EXAMPLES 7 AND 8 AND COMPARATIVE EXAMPLES 9 TO 11

In preparing 8-mm video tape samples for Examples 20 to 26, Reference Examples 7 and 8, and Comparative Examples 9 to 11 in accordance with the same process as in Example 7, the following composition for a single magnetic layer was used:

| Magnetic Composition for Single layer | Parts |
|---|---|
| Ferromagnetic Fe—Co alloy powder | 100 |
| [Fe/CO atomic ratio, 100/30; Al, 4 atomic %; Y, 4 atomic %; Hc, 2300 Oe; $\sigma_s$, 140 emu/g; $S_{BET}$, 52 m$^2$/g; major-axis length, 0.1 $\mu$m; crystallite size, 160 Å; pH, 9] | |
| Phosphorus compound | shown in Table 6 |
| Polyurethane resin (shown in Tables 1 and 6) | 8 |
| Vinyl chloride copolymer | 10 |
| (MR-110, trade name, produced by Nippon Zeon Co., Ltd.) | |
| Carbon black (average particle size: 80 nm) | 1 |
| Alumina (average particle size: 0.2 $\mu$m) | 5 |
| Stearic acid | 0.5 |
| Butyl stearate | 1.2 |
| Polyisocyanate | 6 |
| (Coronate L, trade name, produced by Nippon Polyurethane Co., Ltd.) | |
| Methyl ethyl ketone | 120 |
| Cyclohexanone | 120 |

Further, 8-mm video tape samples for Examples 27 and 28 were each prepared as follows:

| | Parts |
|---|---|
| Magnetic Composition for Upper layer | |
| Ferromagnetic Fe—Co alloy powder | 100 |
| [Fe/Co atomic ratio, 100/30; Al, 4 atomic %; Y, 4 atomic %; Hc, 2300 Oe; $\sigma_s$, 140 emu/g; $S_{BET}$, 52 m$^2$/g; major-axis length, 0.1 $\mu$m; crystallite size, 160 Å; pH, 9] | |
| Phosphorus compound | shown in Table 7 |
| Polyurethane resin (shown in Tables 1 and 7) | 8 |
| Vinyl chloride copolymer | 10 |
| (MR-110, trade name, produced by Nippon Zeon Co., Ltd.) | |
| Carbon black (average particle size: 80 nm) | 1 |
| Alumina (average particle size: 0.2 $\mu$m) | 5 |
| Stearic acid | 0.5 |
| Butyl stearate | 1.2 |
| Polyisocyanate | 6 |
| (Coronate L, trade name, produced by Nippon Polyurethane Co., Ltd.) | |
| Methyl ethyl ketone | 120 |
| Cyclohexanone | 120 |
| Non-magnetic Composition for Undercoat Layer | |
| Non-magnetic powder TiO$_2$ | 100 |
| [average particle size, 35 nm; $S_{BET}$, 40 m$^2$/g; surface-treated with Al compound; TiO$_2$ content, at least 90%; pH, 7.5] | |
| Phosphorus compound | shown in Table 7 |
| Polyurethane resin (shown in Tables 1 and 7) | 8 |
| Vinyl chloride copolymer | 10 |
| (MR-110, trade name, produced by Nippon Zeon Co., Ltd.) | |
| Carbon black (average particle size: 20 nm) | 15 |
| Alumina (average particle size: 0.2 $\mu$m) | 10 |
| Stearic acid | 0.5 |
| Butyl stearate | 1.2 |
| Polyisocyanate | 6 |
| (Coronate L, trade name, produced by Nippon Polyurethane Co., Ltd.) | |
| Methyl ethyl ketone | 120 |
| Cyclohexanone | 120 |

The ingredients constituting the foregoing non-magnetic Composition for an undercoat layer were kneaded and dispersed, and further filtered through a filter having an average pore size of 1 $\mu$m to prepare a coating composition.

On a 10 $\mu$m-thick polyethylene naphthalate support, the coating composition prepared above was coated by means of a reverse roll in a dry thickness of 2.0 $\mu$m, thereby forming an undercoat layer. Immediately thereafter, the coating composition prepared from the aforementioned magnetic composition was coated on the undercoat layer in a dry thickness of 0.2 $\mu$m. Further, the double-coated material thus obtained was subjected to the same treatments as in Example 7 to prepare each magnetic recording medium.

The thus prepared magnetic recording media (Examples 20 to 28, Reference Examples 7 and 8, and Comparative Examples 9 to 11) were examined for their individual characteristics in accordance with the same measuring methods as in Example 7, and the results are shown in Table 6 and 7.

In addition, the $\mu$-value was determined under the following condition: Load, 20 g/8 mm; sliding rate, 14 mm/sec; rubbing material, a SUS420J stainless rod; Ra, 0.08 $\mu$m; wrapping angle, 180°; number of running-repeated times, 100; and atmosphere, 40° C.-80% RH. The highest of the measured values was chosen in calculating the $\mu$-value.

TABLE 6

| Sample Tape | Magnetic Layer | | | | Ra (nm) | Reproduced Output (λ = 0.5 μm) (dB) | $\mu$-value | Change in Output by 1000-Pass Run (dB) |
|---|---|---|---|---|---|---|---|---|
| | Poly-urethane Resin | Phosphorus Compound | | P/Fe ratio | | | | |
| | | species | Content (mol/kg) | | | | | |
| Example 20 | E | phenylphosphonic acid | 0.07 | 0.25 | 2.4 | 1.5 | 0.28 | −1 |
| Example 21 | E | phenylphosphonic acid | 0.2 | 0.7 | 2.2 | 1.9 | 0.26 | −0.6 |
| Example 22 | E | phenylphosphonic acid | 0.3 | 1.1 | 1.9 | 2.4 | 0.25 | −0.3 |
| Example 23 | E | phenylphosphonic acid | 0.45 | 1.6 | 2.3 | 2.2 | 0.27 | −0.5 |
| Example 24 | D | phenylphosphonic acid | 0.3 | 1.1 | 2 | 2 | 0.26 | −0.3 |
| Example 25 | C | phenylphosphonic acid | 0.3 | 1.1 | 2.1 | 2.1 | 0.27 | −0.6 |
| Example 26 | C | phenylphosphate | 0.3 | 1.3 | 2.5 | 1.9 | 0.29 | −0.9 |
| Reference Example 7 | E | phenylphosphonic acid | 0.03 | 0.11 | 2.9 | 0.3 | 0.36 | *1 |
| Reference Example 8 | E | phenylphosphonic acid | 0.55 | 2.3 | 1.7 | 1.6 | 0.4 | *2 |
| Comparative Example 9 | K | — | — | 0.02 | 3.5 | −0.5 | 0.33 | *1 |
| Comparative Example 10 | K | phenylphosphonic acid | 0.2 | 0.7 | 3.2 | −0.2 | 0.29 | −5.7 |
| Comparative Example 11 | K | phenylphosphonic acid | 0.45 | 1.6 | 2.9 | 0 | 0.28 | −6.2 |

*1: Sample tape stopped running after 50-pass running
*2: Sample tape stopped running after 10-pass running

TABLE 7

| Sample Tape | Upper Magnetic Layer | | | | Undercoat Layer | | | | Ra (mn) | Reproduced Output (λ = 0.5 μm) (dB) | $\mu$ value | Change in Output by 1000-Pass Run (dB) |
|---|---|---|---|---|---|---|---|---|---|---|---|---|
| | Poly-urethane Resin | Phosphorus Compound | | P/Fe | Poly-urethane Resin | Phosphorus Compound | | P/Fe | | | | |
| | | species | Content (mol/kg) | | | species | Content (mol/kg) | | | | | |
| Ex. 27 | C | phenylphosphonic acid | 0.3 | 1.1 | C | phenylphosphonic acid | 0.3 | | 2 | 3.5 | 0.26 | −0.5 |
| Ex. 28 | A | phenylphosphonic acid | 0.3 | 1.1 | J | phenylphosphonic acid | 0.3 | | 1.8 | 3.7 | 0.24 | −0.3 |

The data shown in Table 6, which concern magnetic recording media having a single-layer structure, demonstrate that the sample tapes obtained in Examples 20 to 26, each of which contains one of the polyurethane resins of the present invention and a phosphorus compound and further has a P/Fe ratio of 0.2 to 2.0, are superior in reproduced output and running durability to the sample tapes obtained in Comparative Examples 10 and 11 which each contain a phosphorus compound and have a P/Fe ratio in the range of 0.2 to 2.0 but contain a polyurethane resin which is outside the scope of the present invention. In addition, the sample tapes obtained in Reference Examples 7 and 8, which each contain the polyurethane resin of the present invention but have a P/Fe ratio which is outside the range of 0.2 to 2.0 (the P/Fe ratio was less than the lower limit in Reference Example 7, while it was more than the upper limit in Reference Example 8), were considerably inferior in running durability to the other sample tapes.

On the other hand, the data shown in Table 7, which concern magnetic recording media having a double-layer structure, demonstrate that each of the sample tapes obtained in Examples 27 and 28, which contains the polyurethane resin of the present invention and a phosphorus compound in at least upper layer (additionally, the polyurethane resin in the undercoat layer of Example 28 is outside of the scope of the present invention) and further has a P/Fe ratio in the range specified by the present invention, had a low $\mu$-value, high reproduced output and excellent running durability.

EXAMPLES 29 TO 37 AND COMPARATIVE EXAMPLES 12 TO 16

Coating compositions for a magnetic layer, a non-magnetic undercoat layer and a back coat layer were prepared according to the following formulae, respectively.

| | Parts |
|---|---|
| Magnetic Composition | |
| Ferromagnetic Fe—Co alloy powder | 100 |
| [Fe/Co atomic ratio, 100/30; Al, 4 atomic %; Y, 4 atomic %; Hc, 2300 Oe; $\sigma_S$, 140 emu/g; $S_{BET}$, 52 m²/g; major-axis length, 0.1 μm; crystallite size, 160Å; pH, 9] | |
| Phenylphosphonic acid | 3 |
| Polyurethane resin (shown in Table 8) | shown in Table 9 |

-continued

| | Parts |
|---|---|
| Vinyl chloride copolymer | shown in Table 9 |
| (MR-110, trade name, produced by | |
| Nippon Zeon Co., Ltd.) | |
| Carbon black (average particle size: 80 nm) | 1 |
| Alumina (average particle size: 0.2 μm) | 5 |
| Stearic acid | 0.5 |
| Butyl stearate | 1.2 |
| Polyisocyanate | shown in Table 9 |
| (Coronate L, trade name, produced | |
| by Nippon Polyurethane Co., Ltd.) | |
| Methyl ethyl ketone | 120 |
| Cyclohexanone | 120 |
| Non-magnetic Composition for Undercoat Layer | |
| Non-magnetic powder $TiO_2$ | 100 |
| [average particle size, 35 nm; $S_{BET}$, | |
| 40 m$^2$/g; surface-treated with Al compound; | |
| $TiO_2$ content, at least 90%; pH, 7.5] | |
| Phenylphosphonic acid | 3 |
| Polyurethane resin (shown in Table 8) | shown in Table 9 |
| Vinyl chloride copolymer | shown in Table 9 |
| (MR-110, trade name, produced | |
| by Nippon Zeon Co., Ltd.) | |
| Carbon black (average particle size: 20 nm) | 15 |
| Alumina (average particle size: 0.2 μm) | 10 |
| Stearic acid | 0.5 |
| Butyl stearate | 1.2 |
| Polyisocyanate | shown in Table 9 |
| (Coronate L, trade name, produced | |
| by Nippon Polyurethane Co., Ltd.) | |
| Methyl ethyl ketone | 120 |
| Cyclohexanone | 120 |
| Composition for Back Coat Layer | |
| Carbon black A | 100 |
| [average particle size, 15 nm; | |
| $S_{BET}$, 350 m$^2$/g; DBP oil absorption, | |
| 150 ml; pH, 7] | |
| Carbon black B | shown in Table 9 |
| [average particle size, 250 nm; | |
| $S_{BET}$, 10 m$^2$/g; DBP oil absorption, | |
| 35 ml; pH, 10] | |
| Polyurethane resin | 30 |
| (N2301, trade name, produced by Nippon | |
| Polyurethane Co., Ltd.) | |
| α-Alumina | shown in Table 9 |
| [average particle size: 0.2 μm] | |
| Calcium carbonate | 10 |
| Butyl stearate | 1 |
| Copper oleate | 1 |
| Methyl ethyl ketone | 400 |
| Butyl acetate | 300 |
| Toluene | 300 |

As the composition for a back coat layer, the foregoing ingredients were kneaded with a three-rod roll, and dispersed with a sand mill. The dispersion thus obtained was admixed with 20 parts of polyisocyanate and 1,000 parts of methyl ethyl ketone, and filtered through a filter having an average pore size of 1 μm to prepare a back coat layer forming composition.

Magnetic recording materials for Examples 29 to 30 and Comparative Example 12 were each prepared as follows:

The ingredients constituting the aforementioned Magnetic Composition were kneaded and dispersed, and further filtered through a filter having an average pore size of 1 μm to prepare a magnetic coating composition.

This coating composition was coated on a 5.2 μm-thick polyethylene naphthalate support in a dry thickness of 1.2 μm by means of a reverse roll. While the magnetic coating composition coated on the non-magnetic support was still in a wet condition, it was oriented by means of a magnet having a magnetic force of 3000 Gauss. Further, the back coat layer forming composition was applied to the opposite surface of the non-magnetic support using a coil bar coating technique to obtain a back coat layer having the surface properties shown in Table 10. After drying, the resulting material was subjected to a calender roll process using the 7-stage combination of metal rolls at a processing rate of 100 m/min, under a linear pressure of 300 Kg/cm and at a temperature of 90° C., and then wound up in the form of roll. The thus wound material was subjected to a 48 hours' thermoprocessing at 70° C. The thus processed magnetic recording medium was slit into tapes having a width of 8 mm.

Magnetic recording materials for Examples 31 to 37 and Comparative Examples 13 to 16 were each prepared as follows:

The ingredients constituting the foregoing non-magnetic Composition for an undercoat layer were kneaded and dispersed, and further filtered through a filter having an average pore size of 1 μm to prepare a coating composition.

On a polyethylene naphthalate support having a thickness as shown in Table 9, the coating composition prepared above was coated by means of a reverse roll in a dry thickness of 1.2 μm, thereby forming an undercoat layer. Immediately thereafter, the aforementioned Magnetic Composition was coated on the undercoat layer in a dry thickness as shown in Table 9. Further, the double-coated material thus obtained was subjected to the same treatments as in Example 29 to prepare each magnetic recording medium. Additionally, whether or not each of the thus prepared magnetic recording media was subjected to the thermoprocessing described above is shown in Table 9.

The characteristics of each of the thus obtained present and comparative magnetic recording medium were examined using the measuring procedures described below, and the examination results are shown in Table 10:

[Measuring Procedures]

1) $B_{100}$ and $B_{200}$:

The numbers, $B_{100}$ and $B_{200}$ were measured by a method as described hereinbefore.

2) Electromagnetic characteristics (output, C/N, deflection width):

Signals of 7 MHz were recorded and reproduced on each sample tape with a video deck (model FUJIX8, made by Fuji Photo Film Co., Ltd.). The 7 MHz signal-reproduced output data shown in Table 10 are relative values, with the standard magnetic tape prepared in Comparative Example 12 being taken as 0 dB. Ten rolls of tape were cut out of the core side of each magnetic recording medium in a bulk state, and further ten rolls of tape were cut out of the outer side of the same magnetic recording medium. The output values of these 10 rolls of tape were measured, and the mean thereof (shown as "Output" in Table 10) and the deflection width from the mean were evaluated. In addition, each magnetic recording material was examined for C/N ratio, or the ratio of the 7 MHz carrier output to the noise output at the frequency 0.5 MHz apart from the carrier frequency. The C/N data shown in Table 10 are relative values, with the sample tape obtained in Comparative Example 12 being taken as 0.

3) Rate of thermal shrinkage:

The thermal shrinkage rate was measured by a method as described hereinbefore.

4) Damage by 5000-pass running:

After a 7 MHz signal-inputted sample tape having a length of one-minute recording has undergone 5000-pass running under room temperature, not only an increase in drop out is counted with a Shibasoku drop-out counter under the condition of 5 μsec-18 dB, but also whether or not the tape edge received damage is ascertained by the observation under a scanning electron microscope (SEM). The evaluation criteria of the damage are as follows;

Excellent: There is no increase in drop out, and no lack in tape edge is observed.

Good: An increase in drop out is 50 or less per minute by count, and some lack in tape edge is observed.

Fair: An increase in drop out is 100 or less per minute by count, and some lack in tape edge is observed.

Poor: An increase in drop out is 100 or less per minute by count, and appreciable lack in tape edge is observed.

Bad: An increase in drop out is 1,000 or more per minute by count, and appreciable lack in tape edge is observed.

5) Clogging during 10-pass running:

After 8 rolls of sample tape having a length of 120-minute recording have undergone a recording operation with 8 separate video decks (Model EV-C45, made by SONY Corp.), they are each made to run repeatedly for 10 times. During this 10-pass running, they are examined as to how many times they cause a drop of 3 dB in output for shorter than 30 seconds in RF output. The evaluation criteria of clogging are as follows:

Good: The foregoing drop in RF output is caused within 5 times.

Poor: The foregoing drop in RF output is caused less than 10 times.

Bad: The foregoing drop in RF output is caused at least 10 times, or a drop for 30 seconds or longer in RF output is caused.

6) μ-Value (coefficient of kinetic friction) of back coat layer:

The μ-value of each sample tape against a SUS420J stainless rod having a diameter of 4 mm was measured at a wrapping angle of 180°, with a load of 20 g and at a sliding rate of 14 mm/sec, and the friction coefficient is calculated according to Euler's equation;

$$\mu = (1/\pi) \ln(T_2/10) \quad T_2: \text{sliding resistance (g)}$$

Additionally, the measurement was repeated 1,000 times on the same area, and the μ-value at the first time (1P) and that at the 1000th time (1000P) are both examined to evaluate a change in μ-value.

Additionally, in Table 9 shown below, the term polyurethane resin is abbreviated as "PUR", the term vinyl chloride resin is abbreviated as "VC", and the mark L* means polyisocyanate.

TABLE 8

| Polyurethane Resin L | |
|---|---|
| Molecular weight: 3.6 × 10⁴ | |
| Tg: 94° C. | |
| Composition: | |
| Hydrogenated bisphenol A | 0.6 mole |
| Polypropylene oxide adduct | 0.3 mole |
| of bisphenol A (molecular weight: 700) | |
| Sodium salt of bis(2-hydroxyethyl) | 0.05 mole |
| sulfoisophthalate | |
| Diphenylmethane diisocyanate | 1.0 mole |
| Trimethylolpropane | 0.05 mole |
| —SO₃Na group content: 6.0 × 10⁻⁵ eq/g | |
| Polyurethane Resin M | |
| Molecular weight: 4 × 10⁴ | |
| Tg: 38° C. | |
| Composition: | |
| Neopentyl glycol | 2.5 moles |
| Hydroxycaproic acid | 3.1 moles |
| Phthalic acid | 2.8 moles |
| Sodium salt of bis(2-hydroxyethyl) | 0.1 mole |
| sulfoisophthalate | |
| Diphenylmethane diisocyanate | 1.0 mole |
| —SO₃Na group content: 6.0 × 10⁻⁵ eq/g | |

TABLE 9

| Sample Tape | Support Species | Upper Layer Thickness (μm) | Thickness (μm) | Binder Amount (parts) | Binder Composition PUR type | PUR parts | VC parts | L* parts | Lower Layer Thickness (μm) | Binder Amount (parts) | Binder Composition PUR type | PUR parts | VC parts | L* parts |
|---|---|---|---|---|---|---|---|---|---|---|---|---|---|---|
| Ex. 29 | PEN | 5.2 | 1.2 | 18 | L | 12 | 0 | 6 | — | — | — | — | — | — |
| Ex. 30 | " | " | " | " | L | 4.5 | 9 | 4.5 | — | — | — | — | — | — |
| Ex. 31 | " | " | 0.3 | " | L | " | " | " | 1.2 | 24 | A | 6 | 12 | 6 |
| Ex. 32 | " | " | " | " | L | 12 | 0 | 6 | " | " | " | " | " | " |
| Ex. 33 | " | " | " | " | L | " | " | " | " | " | " | " | " | " |
| Ex. 34 | " | " | " | " | L | " | " | " | " | " | " | " | " | " |
| Ex. 35 | " | " | " | " | L | " | " | " | " | " | " | " | " | " |
| Ex. 36 | " | 6.5 | " | " | L | " | " | " | " | " | " | " | " | " |
| Ex. 37 | Aramide | 3.3 | " | " | L | " | " | " | " | " | " | " | " | " |
| Compar. Ex. 12 | PEN | 5.2 | 1.2 | 18 | M | 4.5 | 9 | 4.5 | — | — | — | — | — | — |
| Compar. Ex. 13 | " | " | " | 0.3 | " | M | " | " | " | 1.2 | 24 | C | 6 | 12 | 6 |
| Compar. Ex. 14 | " | " | " | " | M | 12 | 0 | 6 | " | " | " | " | " | " |

TABLE 9-continued

| | | | | | | | | | | | | | |
|---|---|---|---|---|---|---|---|---|---|---|---|---|---|
| Compar. Ex. 15 | " | " | " | " | M | " | " | " | " | " | " | " | " |
| Compar. Ex. 16 | Ara-mide | 3.3 | " | " | M | 4.5 | 9 | 4.5 | " | " | " | " | " |

| | | Back Coat Layer | | | Thermo- | |
|---|---|---|---|---|---|---|
| | Sample Tape | Thickness (μm) | Carbon Black B parts | α-Alumina parts | Processing (70° C.-48 hr) | Layer Constitution |
| | Ex. 29 | 0.5 | 3 | 1 | received | Sigle |
| | Ex. 30 | " | " | " | " | " |
| | Ex. 31 | " | " | " | " | Double |
| | Ex. 32 | " | " | " | " | " |
| | Ex. 33 | " | 5 | 2 | " | " |
| | Ex. 34 | " | 0.5 | 0 | " | " |
| | Ex. 35 | " | 3 | 1 | not received | " |
| | Ex. 36 | " | " | " | received | " |
| | Ex. 37 | " | " | " | " | " |
| | Compar. Ex. 12 | 0.5 | 3 | 1 | received | Single |
| | Compar. Ex. 13 | " | " | " | " | Double |
| | Compar. Ex. 14 | " | " | " | " | " |
| | Compar. Ex. 15 | " | " | " | not received | " |
| | Compar. Ex. 16 | " | " | " | received | " |

TABLE 10

| Sample Tape | Projection on Back Coat Layer | | Electromagnetic Characteristics | | | Thermal Shrinkage Rate (%) | Damage after 500-pass | Jamming during 10-pass | μ-Value of Backing Layer | |
|---|---|---|---|---|---|---|---|---|---|---|
| | $B_{100}$ | $B_{200}$ | Out-put | C/N | deflection Width | 70° C.-48 hr | Running | Running | 1P | 1000P |
| Example 29 | 900 | 80 | 2.5 | 1.5 | 1.0 | 0.06 | Good | Good | 0.18 | 0.28 |
| Example 30 | 900 | 80 | 1.5 | 1.2 | 1.2 | 0.06 | Good | Good | 0.18 | 0.28 |
| Example 31 | 900 | 80 | 3.0 | 3.3 | 1.4 | 0.05 | Good | Good | 0.18 | 0.28 |
| Example 32 | 900 | 80 | 3.5 | 4.0 | 1.2 | 0.05 | Excellent | Good | 0.18 | 0.28 |
| Example 33 | 2600 | 250 | 3.0 | 2.5 | 1.8 | 0.05 | Fair | Good | 0.14 | 0.28 |
| Example 34 | 120 | 10 | 3.6 | 4.3 | 0.7 | 0.05 | Good | Good | 0.25 | 0.55 |
| Example 35 | 120 | 10 | 4.0 | 4.6 | 0.6 | 0.24 | Good | Good | 0.18 | 0.28 |
| Example 36 | 120 | 10 | 3.9 | 4.4 | 1.0 | 0.04 | Good | Godd | 0.18 | 0.28 |
| Example 37 | 1200 | 105 | 2.5 | 3.5 | 1.8 | 0.10 | Good | Good | 0.17 | 0.25 |
| Comparative Example 12 | 900 | 80 | 0 | 0 | 2.4 | 0.07 | Poor | Good | 0.18 | 0.28 |
| Comparative Example 13 | 900 | 80 | 1.0 | 1.0 | 2.8 | 0.06 | Poor | Good | 0.18 | 0.28 |
| Comparative Example 14 | 900 | 80 | 0 | −0.5 | 3.2 | 0.06 | Poor | Poor | 0.18 | 0.28 |
| Comparative Example 15 | 900 | 80 | 1.0 | −0.5 | 1.8 | 0.25 | Bad | Poor | 0.18 | 0.36 |
| Comparative Example 16 | 1200 | 105 | 0 | 0.5 | 3 | 0.10 | Poor | Good | 0.17 | 0.25 |

As is apparent from the results of Tables 8 to 10, the magnetic recording tapes prepared in Comparative Examples 12 to 16, each of which did not use the present polyurethane resin in the magnetic layer, were entirely inferior to the magnetic tapes of the present invention (Examples 29 to 37) in electromagnetic characteristics and running durability, although those comparative tapes had their individual surface properties within the scope of the present invention on the back side of the non-magnetic support.

EXAMPLES 38 TO 49, REFERENCE EXAMPLES 9 TO 10 AND COMPARATIVE EXAMPLES 17 TO 26

The filler and the polyurethane resin as a binder used for an upper layer in each of the present, reference and comparative examples are shown in Table 11 and Table 12, respectively.

TABLE 11

| Species of Filler | | Average Particle Size | Specific Surface Area | DBP Oil Absorption |
|---|---|---|---|---|
| Symbol | Name | | | |
| A | Carbon black | 0.08 μm | 28 m²/g | 61 ml/100 g |
| B | Melamine-formaldehyde condensate resin | 0.3 μm | 20 m²/g | 80 ml/100 g |

TABLE 12

| Symbol | Polyesterpolyurethane Resin |
| --- | --- |
| L | Same as shown in Table 8 |
| M | Same as shown in Table 8 |

EXAMPLE 38

| Magnetic Composition | Parts |
| --- | --- |
| Ferromagnetic metal alloy fine powder | 100 |
| Composition: Fe/Co atomic ratio, 100/30; | |
| Al, 7.1 atomic %; Si, 0.8 | |
| atomic %; Y, 6.5 atomic % | |
| Hc: 2250 Oe | |
| Specific surface area determined by | |
| BET method ($S_{BET}$): 56 m$^2$/g | |
| Crystallite size: 165Å | |
| Particle size (major-axis length): 0.065 μm | |
| Acicular ratio: 5 | |
| $\sigma_S$: 142 emu/g | |
| Vinyl chloride copolymer | 11 |
| (MR-110, trade name, produced by Nippon | |
| Zeon Co., Ltd.) | |
| Polyesterpolyurethane resin L shown in Table 12 | 5 |
| α-Al$_2$O$_3$ (average particle size: 0.15 μm) | 10 |
| Filler A shown in Table 11 | 0.5 |
| sec-Butyl stearate | 1 |
| Stearic acid | 5 |
| Methyl ethyl ketone | 120 |
| Cyclohexanone | 120 |

The above-described composition was kneaded with an open kneader, and then dispersed with a sand mill. The dispersion obtained was admixed with 5 parts of polyisocyanate (Coronate L, trade name, produced by Nippon Polyurethane Co., Ltd.) and 40 parts of a methyl ethyl ketone-cyclohexanone mixed solvent, and filtered through a filter having an average pore size of 1 μm to prepare a magnetic coating composition.

This coating composition was coated on a 5.5 μm-thick polyethylene naphthalate support in a dry thickness of 0.7 μm. The support used herein had a center-line average surface roughness of 0.001 μm on the magnetic layer-provided side. While the composition coated was still in a wet condition, it was oriented by means of, in succession, a cobalt magnet having a magnetic force of 3000 Gauss and a solenoid having a magnetic force of 3000 Gauss. Then, the resulting material was dried and further processed with a 7-stage calender constituted of metal rolls alone at a rate of 200 m/min at a temperature of 80° C. Thereafter, the same back coat layer-forming composition as in Example 1 was coated on the back side of the support in a dry thickness of 0.5 μm. The thus prepared magnetic recording medium was slit into digital video tapes of a width of 8 mm.

COMPARATIVE EXAMPLE 17

Another sample of digital video tape was prepared in the same manner as in Example 38, except that the foregoing urethane resin was changed to M from L.

EXAMPLE 39

| | Parts |
| --- | --- |
| Magnetic Composition for Upper Layer | |
| Ferromagnetic metal alloy fine powder | 100 |
| Composition: Fe/Co atomic ratio, 100/30; | |
| Al, 7.1 atomic %; Si, 0.8 | |
| atomic %; Y, 6.5 atomic % | |
| Hc: 2250 Oe | |
| Specific surface area determined by | |
| BET method ($S_{BET}$): 56 m$^2$/g | |
| Crystallite size: 165Å | |
| Particle size (major-axis length): 0.065 μm | |
| Acicular ratio: 5 | |
| $\sigma_S$: 142 emu/g | |
| Vinyl chloride copolymer | 11 |
| (MR-110, trade name, produced by Nippon | |
| Zeon Co., Ltd.) | |
| Polyesterpolyurethane resin L shown in Table 12 | 5 |
| α-Al$_2$O$_3$ (average particle size: 0.15 μm) | 10 |
| Filler A shown in Table 11 | 0.3 |
| sec-Butyl stearate | 1 |
| Stearic acid | 5 |
| Methyl ethyl ketone | 120 |
| Cyclohexanone | 120 |
| Non-Magnetic Composition for Lower Layer | |
| α-Fe$_2$O$_3$ Hematite (non-magnetic powder) | 80 |
| [major-axis length, 0.14 μm; $S_{BET}$, 55 m$^2$/g; | |
| pH, 8; tapping density, 1.0; DBP oil absorption, 27–38 g/100 g; surface covering compound, Al$_2$O$_3$ and SiO$_2$] | |
| Carbon black | 20 |
| [average primary particle size, 16 mμ; DBP | |
| oil absorption, 80 ml/100 g; pH, 8.0; | |
| $S_{BET}$, 250 m$^2$/g; volatile content, 1.5%] | |
| Vinyl chloride copolymer | 12 |
| (MR-104, trade name, produced by Nippon | |
| Zeon Co., Ltd.) | |
| Polyesterpolyurethane resin L shown in Table 12 | 5 |
| α-Al$_2$O$_3$ (average particle size: 0.15 μm) | 1 |
| sec-Butyl stearate | 1.5 |
| Stearic acid | 1 |
| Methyl ethyl ketone | 100 |
| Cyclohexanone | 100 |
| Toluene | 50 |

Each of the above-described compositions was kneaded with an open kneader, and then dispersed with a sand mill. The dispersion obtained for the lower layer was admixed with 5 parts of polyisocyanate (Coronate L, trade name, produced by Nippon Polyurethane Co., Ltd.). To each of the resulting dispersions, 40 parts of a methyl ethyl ketone-cyclohexanone mixed solvent was further added, and then filtered through a filter having an average pore size of 1 μm. Thus, coating compositions for forming lower and upper layers were prepared separately.

On a 5.5 μm-thick polyethylene naphthalate support having a center-line average surface roughness of 0.001 μm on the magnetic layer-provided side, those coating compositions were coated using a simultaneous double-layer coating method so that the lower layer had a dry thickness of 1 μm and the magnetic upper layer provided thereon had a dry thickness of 0.2 μm. The resulting material was oriented by means of, in succession, a cobalt magnet having a magnetic force of 3000 Gauss and a solenoid having a magnetic force of 3000 Gauss while the compositions coated were still in a wet condition, and then dried. Further, it was processed with a 7-stage calender constituted of metal rolls alone at a rate of 200 m/min at a temperature of 80° C. Thereafter, the same back coat layer-forming composition as in Example 1 was coated on the back side of the support in a dry thickness of 0.5 µm. The thus prepared magnetic recording medium was slit into digital video tapes of a width of 8 mm.

EXAMPLE 40

The same as in Example 39, except that the amount of Filler A in the upper layer was changed to 1.0 part.

EXAMPLE 41

The same as in Example 39, except that the amount of Filler A in the upper layer was changed to 2.0 part.

EXAMPLE 42

The same as in Example 39, except that the polyurethane in the upper layer was changed to M from L and the amount of Filler A in the upper layer was changed to 1.0 part.

EXAMPLE 43

The same as in Example 39, except that the polyurethane in the lower layer was changed to M from L and the amount of Filler A in the upper layer was changed to 1.0 part.

REFERENCE EXAMPLE 9

The same as in Example 39, except that the amount of Filler A in the upper layer was changed to 0.05 part.

REFERENCE EXAMPLE 10

The same as in Example 39, except that the amount of Filler A in the upper layer was changed to 3.0 parts.

COMPARATIVE EXAMPLE 18

The same as in Example 39, except that the polyurethane in both lower and upper layers was changed to M from L.

COMPARATIVE EXAMPLE 19

The same as in Example 39, except that the polyurethane in both lower and upper layers was changed to M from L and the amount of Filler A in the upper layer was changed to 1.0 part.

COMPARATIVE EXAMPLE 20

The same as in Example 39, except that the polyurethane in both lower and upper layers was changed to M from L and the amount of Filler A in the upper layer was changed to 2.0 parts.

EXAMPLE 44

The same as in Example 39, except that the filler in the upper layer was changed to B from A and the amount thereof was changed to 0.1 part.

EXAMPLE 45

The same as in Example 39, except that the filler in the upper layer was changed to B from A and the amount thereof was changed to 1.5 parts.

COMPARATIVE EXAMPLE 21

The same as in Example 44, except that the polyurethane in both lower and upper layers was changed to M from L.

COMPARATIVE EXAMPLE 22

The same as in Example 45, except that the polyurethane in both lower and upper layers was changed to K from L.

EXAMPLE 46

The same as in Example 40, except that the thickness of the upper layer was changed to 0.6 µm.

COMPARATIVE EXAMPLE 23

The same as in Example 40, except that the polyurethane in both lower and upper layers was changed to M from L.

EXAMPLE 47

The same as in Example 41, except that the thickness of the lower layer was changed to 3.0 µm.

COMPARATIVE EXAMPLE 24

The same as in Example 47, except that the polyurethane in both lower and upper layers was changed to M from L.

EXAMPLE 48

The same as in Example 41, except that the calendering temperature was changed to 100° C.

COMPARATIVE EXAMPLE 25

The same as in Example 41, except that the polyurethane in both lower and upper layers was changed to M from L.

EXAMPLE 49

The same as in Example 40, except that the magnetic powder used in the upper layer was changed to the following ferromagnetic metal alloy fine powder:

Composition: Fe/Co atomic ratio, 100/30; Al, 10.5 atomic %; Si, 0.8 atomic %; Y, 6.5 atomic %

Hc: 2300 Oe

Specific surface area determined by BET method ($S_{BET}$): 55 m$^2$/g

Crystallite size: 150 A

Particle size (major-axis length): 0.05 µm

Acicular ratio: 5

$\sigma_s$: 145 emu/g

COMPARATIVE EXAMPLE 26

The same as in Example 49, except that the polyurethane in both lower and upper layers was changed to M from L.

The characteristics of each of the thus obtained present and comparative magnetic recording media were examined using the measuring methods described below, and the examination results are shown in Tables 13 to 17:

[Measuring Methods]

<Thickness of Magnetic Layer>

A strip of a width of about 0.1 µm was cut out of each magnetic recording medium with a diamond cutter in which the cutter was moved in the length direction of the recording medium. The profile of this strip was observed under a transmission electron microscope of 3×10$^4$ magnifications, and a photograph thereof was taken. The photograph was printed on a photographic paper having a size of A4 plate (size: 210×297 mm). While paying attention to a shape distinction between a ferromagnetic power and a non-magnetic powder, the interface between the magnetic layer and the non-magnetic layer was bordered with black ink by visual judgement. Similarly thereto, the surface of the magnetic layer was also bordered with black ink. The space between these two black border lines was measured with an image processing apparatus IBAS2, made by Zeiss A.G.

Therein, the space was measured at specific points picked in the length direction of the photographic paper, namely from the range of 21 cm, and the arithmetic mean of these measured values was taken as the thickness of the magnetic layer examined.

<Surface Roughness (Ra) of Magnetic Layer>

In accordance with MIRAU method, each magnetic layer surface was examined for Ra in the area of about 250 nm×250 nm by means of a photo-interference three-dimensional roughness tester, TOPO3D, made by WYKO (Arizona in US). The wavelength used for measurement was about 650 nm, and spherical and cylindrical corrections were made on the measured value.

<Number of Minute Projections>

Minute projections present in a square area of 30 $\mu$m by 30 $\mu$m (900 $\mu m^2$) on each magnetic layer surface were observed for each 10 nm increase up to 40 nm in projection height under an atomic force microscope (AFM), Nanoscope 3, made by Digital Instruments Corp., wherein a SiN exploring needle with a quadrangular pyramidal shape having an edge angle of 700 was used. In the observation, the number ($M_{10}$) of projections having their heights in the range of 10 nm to lower than 20 nm, and the number ($M_{20}$) of projections having their heights in the range of 20 nm to lower than 40 nm, were counted respectively, and the $M_{10}/M_{20}$ ratio was determined.

<Electromagnetic Characteristics>

In measurement of output, the recording wavelengths of 0.488 $\mu$m and 22 $\mu$m, Reference ME Tape, made by Fuji Photo Film Co., Ltd., as a reference, and a stationary-head tester with a rotating drum were used. The measurement was performed at a relative rate of 10.2 m/sec. The head used was a Fe head having a Bs of 1.5 T.

<$\mu$-value>

The $\mu$-value of each sample tape against a SUS420J stainless rod having a diameter of 4 mm was measured at a wrapping angle of 180°, with a load of 10 g and at a sliding rate of 18 mm/sec, and the friction coefficient was calculated according to Euler's equation;

$$\mu = (1/\pi) \, ln(T_2/10) \quad T_2: \text{sliding resistance (g)}$$

<Tape Running Durability>

After 10 rolls of sample tape having a length of 10-minute recording had undergone 500-pass running in the atmosphere of 23° C.-70% RH with 10 separate 8 mm-video decks (Model FUJIX8, made by Fuji Photo Film Co., Ltd/), they were examined as to how many times they cause a drop out. The tape running durability was evaluated by the number of times of drop out increased over that in the initial running.

TABLE 13

| Sample No. | Example 38 | Comparative Example 17 |
|---|---|---|
| Polyurethane | L | M |
| Filler: | | |
| species | A | A |
| amount | 0.5 | 0.5 |
| Thickness of magnetic layer ($\mu$m) | 0.7 | 0.7 |
| Calendering temperature (° C.) | 80 | 80 |
| Ra (nm) | 2.4 | 2.5 |
| $M_{10}$ | 1198 | 2817 |
| $M_{20}$ | 51 | 49 |
| $M_{10}/M_{20}$ | 23 | 51 |

TABLE 13-continued

| Sample No. | Example 38 | Comparative Example 17 |
|---|---|---|
| Output (dB) | 0.6 | −0.5 |
| $\mu$-value | 0.28 | 0.28 |
| Increase in drop out | 61 | 58 |

TABLE 14

| Sample No. | Example 39 | Example 40 | Example 41 | Example 42 |
|---|---|---|---|---|
| Polyurethane in upper layer | L | L | L | M |
| Polyurethane in lower layer | L | L | L | L |
| Filler in upper layer: | | | | |
| species | A | A | A | A |
| amount | 0.3 | 1.0 | 2.0 | 1.0 |
| Magnetic upper layer thickness ($\mu$m) | 0.2 | 0.2 | 0.2 | 0.2 |
| Non-magnetic lower layer thickness ($\mu$m) | 1.0 | 1.0 | 1.0 | 1.0 |
| Calendering temperature (° C.) | 80 | 80 | 80 | 80 |
| Ra (nm) | 2.0 | 2.0 | 2.3 | 2.0 |
| $M_{10}$ | 303 | 1008 | 3200 | 1020 |
| $M_{20}$ | 22 | 62 | 151 | 60 |
| $M_{10}/M_{20}$ | 14 | 16 | 21 | 17 |
| Output (dB) | 1.3 | 0.9 | 0.5 | 0.9 |
| $\mu$-value | 0.28 | 0.26 | 0.19 | 0.26 |
| Increase in drop out | 52 | 40 | 20 | 45 |

| Sample No. | Example 43 | Reference Example 9 | Reference Example 10 | Comparative Example 18 |
|---|---|---|---|---|
| Polyurethane | | | | |
| in upper layer | L | L | L | M |
| in lower layer | M | L | L | M |
| Filler in upper layer | | | | |
| species | A | A | A | A |
| amount | 1.0 | 0.05 | 3.0 | 0.3 |
| Magnetic upper layer thickness ($\mu$m) | 0.2 | 0.2 | 0.2 | 0.2 |
| Non-magnetic lower layer thickness ($\mu$m) | 1.0 | 1.0 | 1.0 | 1.0 |
| Calendering temperature (° C.) | 80 | 80 | 80 | 80 |
| Ra (nm) | 2.1 | 2.0 | 2.4 | 2.0 |
| $M_{10}$ | 1061 | 169 | 4260 | 1215 |
| $M_{20}$ | 62 | 10 | 230 | 23 |
| $M_{10}/M_{20}$ | 17 | 15 | 19 | 53 |
| Output (dB) | 0.8 | 1.6 | −0.1 | 0.5 |
| $\mu$-value | 0.26 | 0.34 | 0.19 | 0.29 |
| Increase in drop out | 49 | 362 | 20 | 100 |

| Sample No. | Comparative Example 19 | Comparative Example 20 |
|---|---|---|
| Polyurethane in upper layer | M | M |
| Polyurethane in lower layer | M | M |
| Filler in upper layer: | | |
| species | A | A |
| amount | 1.0 | 2.0 |
| Magnetic upper layer thickness ($\mu$m) | 0.2 | 0.2 |
| Non-magnetic lower layer thickness ($\mu$m) | 1.0 | 1.0 |

TABLE 14-continued

| | | |
|---|---|---|
| Calendering temperature (° C.) | 80 | 80 |
| Ra (nm) | 2.4 | 2.4 |
| $M_{10}$ | 3021 | 8025 |
| $M_{20}$ | 60 | 164 |
| $M_{10}/M_{20}$ | 50 | 49 |
| Output (dB) | 0 | −0.9 |
| $\mu$-value | 0.26 | 0.19 |
| Increase in drop out | 40 | 18 |

TABLE 15

| Sample No. | Example 44 | Example 45 | Comparative Example 21 | Comparative Example 22 |
|---|---|---|---|---|
| Polyurethane | | | | |
| in upper layer | L | L | M | M |
| in lower layer | L | L | M | M |
| Filler in upper layer | | | | |
| species | B | B | B | B |
| amount | 0.1 | 1.5 | 0.1 | 1.5 |
| Magnetic upper layer thickness ($\mu$m) | 0.2 | 0.2 | 0.2 | 0.2 |
| Non-magnetic lower layer thickness ($\mu$m) | 1.0 | 1.0 | 1.0 | 1.0 |
| Calendering temperature (° C.) | 80 | 80 | 80 | 80 |
| Ra (nm) | 2.1 | 2.1 | 2.2 | 2.3 |
| $M_{10}$ | 751 | 3800 | 2510 | 8350 |
| $M_{20}$ | 35 | 200 | 33 | 202 |
| $M_{10}/M_{20}$ | 24 | 19 | 76 | 41 |
| Output (dB) | 1.0 | 0.3 | 0 | −1.0 |
| $\mu$-value | 0.27 | 0.18 | 0.26 | 0.19 |
| Increase in drop out | 63 | 21 | 78 | 20 |

TABLE 16

| Sample No. | Example 46 | Comparative Example 23 | Example 47 | Comparative Example 24 |
|---|---|---|---|---|
| Polyurethane | | | | |
| in upper layer | L | M | L | M |
| in lower layer | L | M | L | M |
| Filler in upper layer | | | | |
| species | A | A | A | A |
| amount | 1.0 | 1.0 | 2.0 | 2.0 |
| Magnetic upper layer thickness ($\mu$m) | 0.6 | 0.6 | 0.2 | 0.2 |
| Non-magnetic lower layer thickness ($\mu$m) | 1.0 | 1.0 | 3.0 | 3.0 |
| Calendering temperature (° C.) | 80 | 80 | 80 | 80 |
| Ra (nm) | 2.2 | 2.3 | 2.0 | 2.1 |
| $M_{10}$ | 2120 | 4530 | 2520 | 5795 |
| $M_{20}$ | 92 | 93 | 120 | 123 |
| $M_{10}/M_{20}$ | 23 | 49 | 21 | 47 |
| Output (dB) | 0.5 | −0.5 | 0.3 | −0.8 |
| $\mu$-value | 0.24 | 0.24 | 0.21 | 0.21 |
| Increase in drop out | 35 | 42 | 62 | 59 |

TABLE 17

| Sample No. | Example 48 | Comparative Example 25 | Example 49 | Comparative Example 26 |
|---|---|---|---|---|
| Polyurethane | | | | |
| in upper layer | L | M | L | M |
| in lower layer | L | M | L | M |
| Filler in upper layer | | | | |
| species | A | A | A | A |
| amount | 2.0 | 2.0 | 1.0 | 1.0 |
| Magnetic upper layer thickness ($\mu$m) | 0.2 | 0.2 | 0.2 | 0.2 |
| Non-magnetic lower layer thickness ($\mu$m) | 1.0 | 1.0 | 1.0 | 1.0 |
| Calendering temperature (° C.) | 100 | 100 | 80 | 80 |
| Ra (nm) | 2.2 | 2.3 | 2.4 | 2.6 |
| $M_{10}$ | 2182 | 4965 | 1820 | 4320 |
| $M_{20}$ | 102 | 110 | 76 | 74 |
| $M_{10}/M_{20}$ | 21 | 45 | 23 | 61 |
| Output (dB) | 0.4 | −0.5 | 1.0 | −0.2 |
| $\mu$-value | 0.22 | 0.22 | 0.24 | 0.25 |
| Increase in drop out | 53 | 46 | 67 | 58 |

Making a comparison between Example 38 and Comparative Example 17, the magnetic recording medium of Example 38, wherein the polyurethane resin L specified by the present invention was used and the numbers of minute projections, $M_{10}$ and $M_{20}$, and the ratio between them, $M_{10}/M_{20}$, were controlled so as to be in the ranges specified respectively by the present invention, showed favorable characteristics with respect to output, friction coefficient and increase in drop out; while the magnetic recording medium of Comparative Example 17, in which the polyurethane resin M outside the scope of the present invention was used and $M_{10}$, $M_{20}$ and $M_{10}/M_{20}$ were outside the scopes specified respectively by the present invention, showed inferiority in output.

Making comparisons among Examples 39 to 43, Reference Examples 9 to 10, and Comparative Examples 18 to 20, the magnetic recording media of Examples 39 to 43, wherein the polyurethane resin L specified by the present invention was used and the numbers of minute projections, $M_{10}$ and $M_{20}$, and the ratio between them, $M_{10}/M_{20}$, were controlled so as to be within the scopes specified respectively by the present invention, showed favorable characteristics with respect to output, friction coefficient and increase in drop out; while the magnetic recording media of Reference Examples 9 to 10 and those of Comparative Examples 18 to 20, in which the polyurethane resin M outside the scope of the present invention was used or $M_{10}$, $M_{20}$ and/or $M_{10}/M_{20}$ was outside the scopes specified respectively by the present invention, showed inferiority in output and caused an increase in drop out.

Making a comparison between Examples 44 to 49 and Comparative Examples 21 to 26, the magnetic recording media of Examples 44 to 49, wherein the polyurethane resin L specified by the present invention was used and the numbers of minute projections, $M_{10}$ and $M_{20}$, and the ratio between them, $M_{10}/M_{20}$, were controlled so as to be within the scopes specified respectively by the present invention, showed favorable characteristics with respect to output, friction coefficient and increase in drop out; while the magnetic recording media of Comparative Examples 21 to 26, in which the polyurethane resin M outside the scope of the present invention was used, $M_{10}$, $M_{20}$ and $M_{10}/M_{20}$ were outside the scopes specified respectively by the present invention, showed inferiority in output.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support having thereon, in succession, an undercoating layer comprising a binder U and an inorganic powder and a magnetic layer comprising a binder M and a ferromagnetic metal powder, wherein said binder M comprises a polyurethane resin which is produced by reacting diols with an organic diisocyanate; said diols comprise a first diol having at least one cyclic hydrocarbon group and a molecular weight of from 50 to less than 500 and a second diol having at least one ether linkage and an average molecular weight of 700 to 3,000; and said first diol is contained in a proportion of from 17 to 40 weight % and said second diol is contained in a proportion of from 10 to 50 weight %, based on said polyurethane resin; and further said ether linkage in said second diol are contained in a content of from 1.0 to 5.0 mmol/g, in terms of said ether linkage based on said polyurethane resin; and wherein said ferromagnetic metal powder comprises Fe, from 10 to 40 atomic % of Co, from 2 to 20 atomic % of Al and from 1 to 15 atomic % of Y, based on said Fe; and has a mean major axis length of from 0.05 to 0.19 and a crystallite size of from 100 to 230 angstrom.

2. The magnetic recording medium as in claim 1, wherein the polyurethane resin has a number average molecular weight of from 5,000 to 100,000 and a weight average molecular weight of from 30,000 to 100,000.

3. The magnetic recording medium as in claim 1, wherein the polyurethane resin has a glass transition temperature (Tg) of from 50° to 200° C.

4. The magnetic recording medium as in claim 1, wherein the polyurethane resin has at least one polar group represented by —$SO_3M$ and —$OSO_3X$, wherein M is a hydrogen atom, alkali metal or ammonium ion, in a content of from $1\times10^{-5}$ to $2\times10^{-4}$ equivalent/g.

5. The magnetic recording medium as in claim 1, wherein the polyurethane resin has on the average from 3 to 20 OH groups per one molecule.

6. The magnetic recording medium as in claim 5, wherein the binder further comprises an isocyanate hardener to be hardened by the reaction of the resins and the isocyanate hardener.

7. The magnetic recording medium as in claim 1, wherein the binder further comprises a polyvinylchloride resin which is a vinyl chloride-polymer containing vinyl chloride as a recurring unit.

8. The magnetic recording medium as in claim 1, wherein the polyurethane resin is contained in an amount of from 10 to 100 weight % per the total weight of the binder.

9. The magnetic recording medium as in claim 1, wherein said magnetic layer has a surface on which the number ($M_{10}$) of projections having a height of from 10 nm to lower than 20 nm and the number ($M_{20}$) of projections having a height of form 20 nm to lower than 40 nm, which are present per square area of 30 $\mu$m×30 $\mu$m when the surface is observed under an interatomic force microscope, are 4,000 or less and 20 or more, respectively; and the ratio of the $M_{10}$ to the $M_{20}$ is 25 or less.

10. The magnetic recording medium as in claim 9, wherein the polyurethane resin has a number average molecular weight of from 5,000 to 100,000 and a weight average molecular weight of from 30,000 to 100,000.

11. The magnetic recording medium as in claim 9, wherein the polyurethane resin has a glass transition temperature (Tg) of from 50° to 200° C.

12. The magnetic recording medium as in claim 9, wherein the polyurethane resin has at least one polar group represented by —$SO_3M$ and —$OSO_3M$, wherein M is a hydrogen atom, alkali metal or ammonium ion, in a content of from $1\times10^{-5}$ to $2\times10^{-4}$ equivalent/g.

13. The magnetic recording medium as in claim 9, wherein the polyurethane resin has on the average from 3 to 20 OH groups per one molecule.

14. The magnetic recording medium as in claim 9, wherein the binder further comprises an isocyanate hardener to be hardened by the reaction of the resins and the isocyanate hardener.

15. The magnetic recording medium as in claim 9, wherein the binder further comprises a polyvinylchloride resin which is a vinyl chloride-polymer containing vinyl chloride as a recurring unit.

16. The magnetic recording medium as in claim 9, wherein the polyurethane resin is contained in an amount of from 10 to 100 weight % per the total weight of the binder.

17. The magnetic recording medium as in claim 9, wherein said support has a back coat layer comprising a binder and inorganic particles dispersed therein on the side opposite to the magnetic layer-provided side, and the back coat layer having a surface on which the number ($B_{100}$) of projections having a height of at least 100 nm which are present per square area measuring 100 $\mu$m by 100 $\mu$m when the surface is observed under an interatomic force microscope, is from 50 to 3,000.

18. The magnetic recording medium as in claim 9, wherein the first diol has a molecular weight of from 100 to 400.

19. The magnetic recording medium as in claim 9, wherein the first diol has a molecular weight of from 100 to 300.

20. The magnetic recording medium as in claim 9, wherein the content of the ether linkages in the second diol in the polyurethane resin is from 2.0 to 4.0 mmol/g, in terms of the ether group based on the polyurethane resin.

21. The magnetic recording medium as in claim 9, wherein the first diol is contained in a proportion of from 20 to 30 weight %, based on the polyurethane resin.

22. The magnetic recording medium as in claim 9, wherein the second diol is contained in a proportion of from 30 to 40 weight %, based on the polyurethane resin.

23. The magnetic recording medium as in claim 9, wherein the polyurethane resin has a number average molecular weight of from 10,000 to 50,000 and a weight average molecular weight of from 40,000 to 60,000.

24. The magnetic recording medium as in claim 9, wherein the polyurethane resin has a glass transition temperature (Tg) of from 80° to 130° D.

25. The magnetic recording medium as in claim 1, wherein said support has a back coat layer comprising a binder and inorganic particles dispersed therein on the side opposite to the magnetic layer-provided side, and the back coat layer having a surface on which the number ($B_{100}$) of projections having a height of at least 100 nm which are present per square area measuring 100 $\mu$m by 100 $\mu$m when the surface is observed under an interatomic force microscope, is from 50 to 3,000.

26. The magnetic recording medium as in claim 1, wherein the first diol has a molecular weight of from 100 to 400.

27. The magnetic recording medium as in claim 1, wherein the first diol has a molecular weight of from 100 to 300.

28. The magnetic recording medium as in claim 1, wherein the content of the ether linkages in the second diol in the polyurethane resin is from 2.0 to 4.0 mmol/g, in terms of the ether group based on the polyurethane resin.

29. The magnetic recording medium as in claim 1, wherein the first diol is contained in a proportion of from 20 to 30 weight %, based on the polyurethane resin.

30. The magnetic recording medium as in claim 1, wherein the second diol is contained in a proportion of from 30 to 40 weight %, based on the polyurethane resin.

31. The magnetic recording medium as in claim 1, wherein the polyurethane resin has a number average molecular weight of from 10,000 to 50,000 and a weight average molecular weight of from 40,000 to 60,000.

32. The magnetic recording medium as in claim 1, wherein the polyurethane resin has a glass transition temperature (Tg) of from 80° to 130° C.

* * * * *

UNITED STATES PATENT AND TRADEMARK OFFICE
CERTIFICATE OF CORRECTION

PATENT NO.    : 6,074,724
DATED         : June 13, 2000
INVENTOR(S)   : Hiroo Inaba et al.

It is certified that error appears in the above-identified patent and that said Letters Patent is hereby corrected as shown below:

Claim 4,
Line 3, delete "and $-OSO_3X$" and substitute -- and $-OSO_3M$ -- in its place.

Claim 9,
Line 5, delete "form" and substitute -- from -- in its place.

Signed and Sealed this

Twenty-fifth Day of September, 2001

Attest:

NICHOLAS P. GODICI
Attesting Officer    Acting Director of the United States Patent and Trademark Office